United States Patent
Obuchi et al.

(10) Patent No.: US 9,265,014 B2
(45) Date of Patent: Feb. 16, 2016

(54) WIRELESS COMMUNICATION SYSTEM, MANAGEMENT STATION, AND METHOD FOR MANAGING

(71) Applicant: FUJITSU LIMITED, Kawasaki-shi (JP)

(72) Inventors: Kazuhisa Obuchi, Yokohama (JP); Eisuke Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 259 days.

(21) Appl. No.: 13/748,667

(22) Filed: Jan. 24, 2013

(65) Prior Publication Data

US 2013/0137416 A1    May 30, 2013

Related U.S. Application Data

(63) Continuation of application No. PCT/JP2010/063640, filed on Aug. 11, 2010.

(51) Int. Cl.
| | |
|---|---|
| H04W 36/00 | (2009.01) |
| H04W 52/28 | (2009.01) |
| H04W 36/32 | (2009.01) |
| H04W 52/24 | (2009.01) |

(52) U.S. Cl.
CPC ............ *H04W 52/282* (2013.01); *H04W 36/32* (2013.01); *H04W 52/245* (2013.01); *H04W 52/283* (2013.01)

(58) Field of Classification Search
CPC ..... H04W 36/00; H04W 36/24; H04W 36/30; H04W 36/32
USPC ............ 455/436, 440, 441, 67.11, 226.2, 453
See application file for complete search history.

(56) References Cited

U.S. PATENT DOCUMENTS

| | | | | |
|---|---|---|---|---|
| 6,480,716 | B2 * | 11/2002 | Salonaho | 455/441 |
| 7,054,631 | B2 * | 5/2006 | Tee | 455/436 |
| 7,120,440 | B2 * | 10/2006 | Cho et al. | 455/441 |
| 7,457,623 | B2 * | 11/2008 | Naghian et al. | 455/439 |
| 7,558,575 | B2 * | 7/2009 | Losh et al. | 455/441 |
| 8,064,903 | B2 * | 11/2011 | Pathan et al. | 455/432.1 |

FOREIGN PATENT DOCUMENTS

| | | |
|---|---|---|
| JP | 10-51836 | 2/1998 |
| JP | 2006-5597 | 1/2006 |
| JP | 2008-259046 | 10/2008 |

OTHER PUBLICATIONS

3GPP TS 36.305 v9.1.0 3$^{rd}$ Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9) (Dec. 2009).

3GPP TR 36.902 v1.2.0 3$^{rd}$ Generation Partnership Project; Technical Specification Group Radio Access Network; Evolved Universal Terrestrial Radio Access Network (E-UTRAN); Self-configuring and self-optimizing network use cases and solutions (Release 9) (May 2009).

* cited by examiner

*Primary Examiner* — Temica M Beamer
(74) *Attorney, Agent, or Firm* — Fujitsu Patent Center

(57) ABSTRACT

In order to properly expel one or more mobile terminals from a cell that a wireless base station is accommodating, the management station includes at least one processor configured to obtain, for each of the plurality of mobile terminals, speed data indicating a moving speed of the mobile terminal; select one or more mobile terminals each having a moving speed, indicated by the speed data, satisfying a first criterion among the plurality of mobile terminals; and control the wireless base station such that the selected mobile terminals are out of communication with the cell.

16 Claims, 13 Drawing Sheets

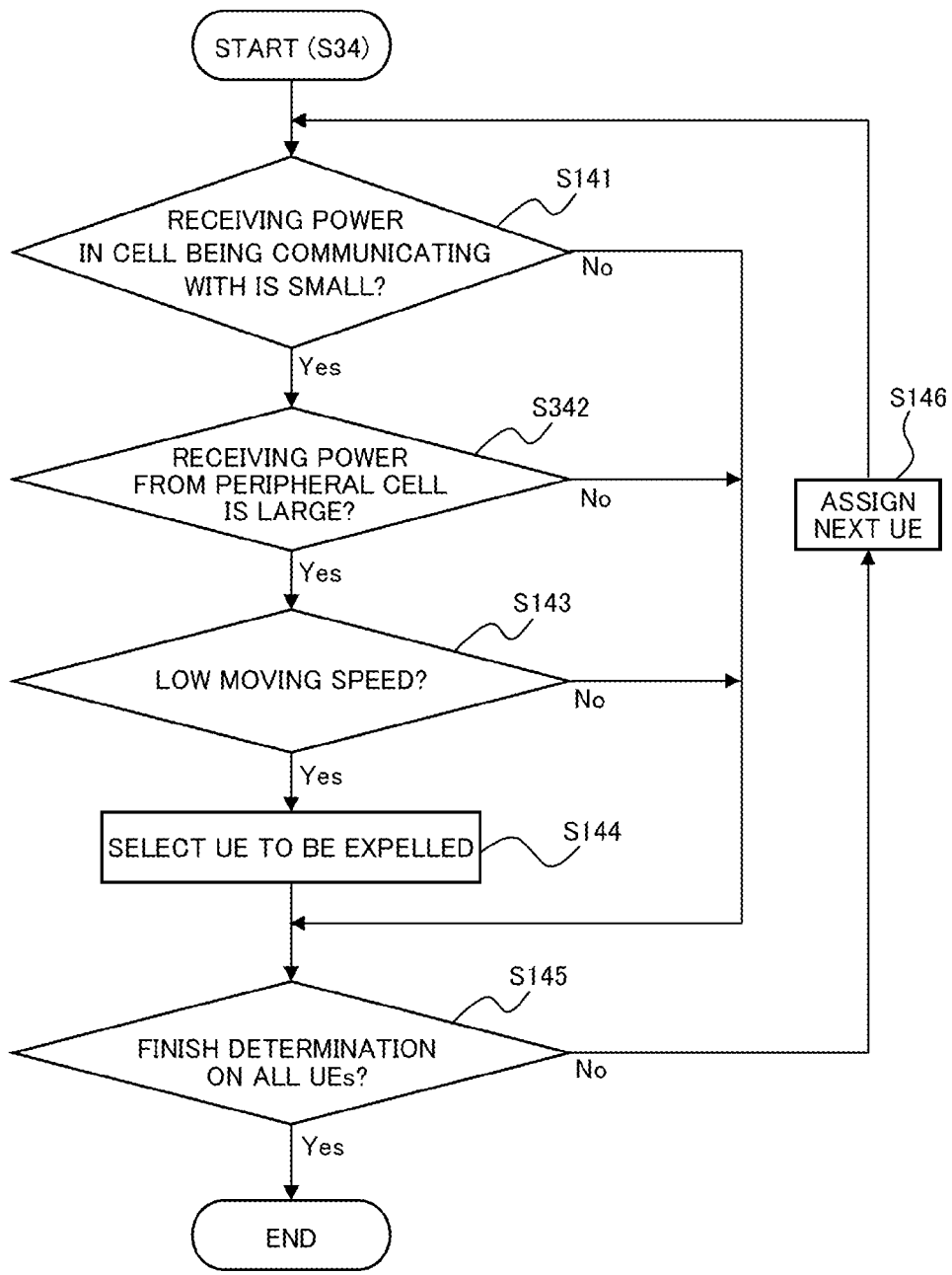

WIRELESS COMMUNICATION SYSTEM, MANAGEMENT STATION, AND METHOD FOR MANAGING

CROSS-REFERENCE TO RELATED APPLICATION

This application is a continuation application of a PCT International Application No. PCT/JP2010/063640, filed on Aug. 11, 2010, the entire contents of which are incorporated herein by reference.

FIELD

The embodiments discussed herein are a management station that manages wireless base stations; a method of managing wireless base stations; and a wireless communication system including wireless base stations, mobile terminals, and a management station.

BACKGROUND

A wireless communication system for, for example, mobile telephones has proposed a Self Organization Network (SON) in order to automatically manage the configuration of the wireless communication system, optimize the performance of the system, and deal with problems. One of the proposed examples of SON uniformalizes traffic through the adjustment of transmission power of a wireless base station in which traffic is being concentrated and the peripheral base stations thereof. Specifically, the traffic load on each wireless base station is monitored and transmission powers at base stations are adjusted such that some of the mobile terminals accommodated by a concentrated base station in which traffic is concentrated, are newly accommodated by a peripheral base station under the control of a managing station such as an MME. Namely, transmission powers of the respective base stations are adjusted such that some of the mobile stations accommodated by the concentrated base station are accommodated by the peripheral base station (that is, such that some of the mobile terminals being communicating with a cell of the concentrated wireless base station come out of communication with the cell).

PRIOR ART REFERENCE

Non-Patent Reference

[Non-Patent Reference 1] 3GPP TS36.305 v9.1.0 Stage 2 functional specification of UE positioning in E-UTRAN
[Non-Patent Reference 2] 3GPP TR36.902 v1.2.0 E-UTRAN SON use cases and solutions

SUMMARY

Among multiple mobile terminals communicating with (accommodated by) a cell of a wireless base station (communicating with a base station using a radio resource served in a cell by the base station), one or more mobile terminals may be moving relatively faster than the remaining mobile terminals. Therefore, the above-described SON technique may made such a mobile terminal moving faster than the remaining mobile terminals out of communication with a cell being under the control of a wireless base station to which traffic is being concentrated. However, there is a possibility that a mobile terminal moving at a high moving speed returns, for its high moving speed, to a cell of the concentrated wireless base station after being out of communication with the same cell. In another case, there is a possibility that a mobile terminal moving at a high moving speed moves to a cell of a peripheral wireless base station (i.e., leaves a cell of the concentrated base station) without adjusting transmission powers of the respective base stations, because of its high moving speed. This may impair the advantages of adjusting transmission power of each wireless base station. Furthermore, there is a possibility that this may make such adjustment of transmission power of each base station useless.

The above problem is solved by a wireless communication system including a wireless base station having a cell accommodating a plurality of mobile terminals; and a management station that controls the wireless base station. The management station includes at least one processor configured to obtain, for each of the plurality of mobile terminals, speed data indicating a moving speed of the mobile terminal, select one or more mobile terminals each having a moving speed, indicated by the speed data, satisfying a first criterion among the plurality of mobile terminals, and control the wireless base station such that the selected mobile terminals are out of communication with the cell. For example, the at least one processor obtains the speed data by receiving speed data sent from the mobile terminals or wireless base station. The speed data may directly or indirectly indicate the moving speed of each mobile terminal. The at least one processor may control the wireless base station such that the selected mobile terminals are out of communication with the cell (i.e., such that the selected mobile terminals are regarded to be out of the range of the cell). An example of controlling the wireless base station is to adjust the transmission power of the wireless base station. The expression "communication with the cell" means "communication with a wireless base station using a radio resource served in the cell by the base station".

The above problem is solved by the above management station (i.e., a management station including the obtaining means, the selecting means, and a controlling means).

The above problem is solved by a method for controlling a wireless station having a cell accommodating a plurality of mobile terminals. The method includes obtaining, selecting, and controlling. The obtaining is achieved by the same process performed by the above obtaining means; the selecting is achieved by the same process performed by the above selecting means; and the controlling is achieved by the same process performed by the above controlling means.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 13 is a flow diagram denoting a succession of procedural steps of selecting an UE to be expelled from a cell of step S34 of FIG. 12.

DESCRIPTION OF EMBODIMENTS

Hereinafter, description will now be made in relation to the best mode to carry out the present invention with reference to the accompanying drawings.

(1) First Embodiment

Description will now be made in relation to a wireless communication system 1 of the first embodiment, which is assumed to be a mobile telephone system conforming to the standard of Long Term Evolution (LTE). However, the embodiments to be detailed below can be, of course, applied to various wireless communication systems except for a mobile telephone system conforming to the LTE.

(1-1) Configuration of the Wireless Communication System:

The configuration of the wireless communication system 1 of the first embodiment will now be described with reference to FIG. 1, which is a block diagram schematically illustrating an example of the configuration of the wireless communication system 1 of the first embodiment.

Figure 1:
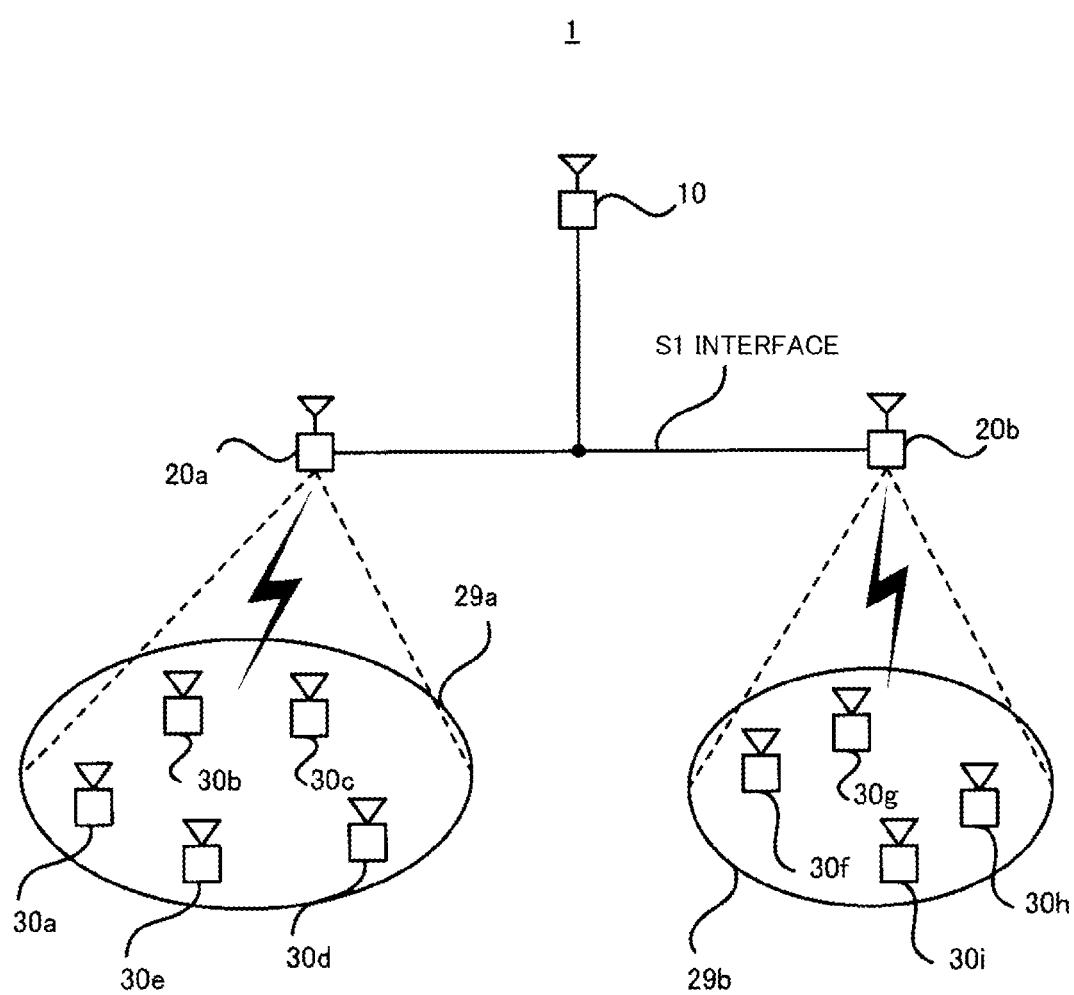
FIG. 1 is a block diagram schematically illustrating the configuration of a wireless communication system according to a first embodiment.

As illustrated in FIG. 1, the wireless communication system 1 of the first embodiment includes a Mobility Management Entity (MME) 10, an evolved Node B (eNB) 20*a*, an eNB 20*b*, User Equipment (UE) 30*a*, UE 30*b*, UE 30*c*, UE 30*d*, UE 30*e*, UE 30*f*, UE 30*g*, UE 30*h*, and UE 30*i*. The number of eNBs 20 and the number of UEs 30 of FIG. 1 are mere examples and are not limited to those of FIG. 1. Hereinafter, when the eNB 20*a* and the eNB 20*b* are not discriminated from each other, these eNBs are represented by the reference number "20". Similarly, when the UEs 30*a*-30*i* are not discriminated from one another, these UEs are represented by the reference numer "30".

The MME 10 serves as a superordinate station that establishes and releases sessions for packet communication, manages the nobilities of UEs 30, and controls handover. The MME 10 of the first embodiment controls the eNBs 20 on the basis of control data (e.g., receiving power data, position data, moving speed data, accommodating-UE number data, and traffic load data to be detailed below) sent from the eNBs 20 through the S1 interface such that transmission powers in the cells 29 accommodatad (served) by the respective eNBs 20 are adjusted (otherwise, such that the sizes or the shapes of the respective cells 29 change).

An eNB 20 is a base station that covers a cell 29 (a so-called macro-cell) having a radius of several km through a dozen or so km or several dozens km. An eNB 20 carries out wireless communication with UEs 30 being located in the cell 29 that the eNB 20 covers. In other words, the eNB 20 establishes a communication connection (session) with each UE 30 being located in the cell 29 that the eNB 20 itself covers, and also transmits and receives data to and from the UE 30. In addition, the eNB 20 comunicates with the MME 10 through the S1 interface.

A UE 30 is a mobile terminal that establishes a communication connection with an eNB 20 which covers the cell 29 where the UE 30 is being located, and also transmits and receives data to and from the eNB 20. The UE 30 is allowed to receive various services and use various applications (e.g., e-mail service, voice communication service, WEB browsing serving, and packet communication service) through the eNB 20 (further for example, a superordinate node such as the MME 10 serving as a higher entity connected to the eNB 20). Examples of the UE 30 are a mobile telephone, a Personal Digital Assistant (PDA), and various information device having a wireless communication function.

Although the above description assumes that a eNB 20 covers a cell 29 (a so-called macro-cell) having a radius of several km through a dozen or so km or several dozens km, a wireless base station that covers a cell (a so-called micro-cell) having a radius of about several hundreds meters through 1 km or a cell (a so-called femto-cell) having a radius of about several meters through a dozen or so meters or several dozens meters may be disposed in addition to or as substitute for the eNB 20. Besides, other wireless base stations may be disposed which cover cells having a radius except for the above.

(1-2) The Configuration of the MME:

The configuration of the MME 10 of the first embodiment will now be described with reference to FIG. 2, which is a block diagram schematically illustrates the configuration of the MME 10 of the first embodiment.

Figure 2:
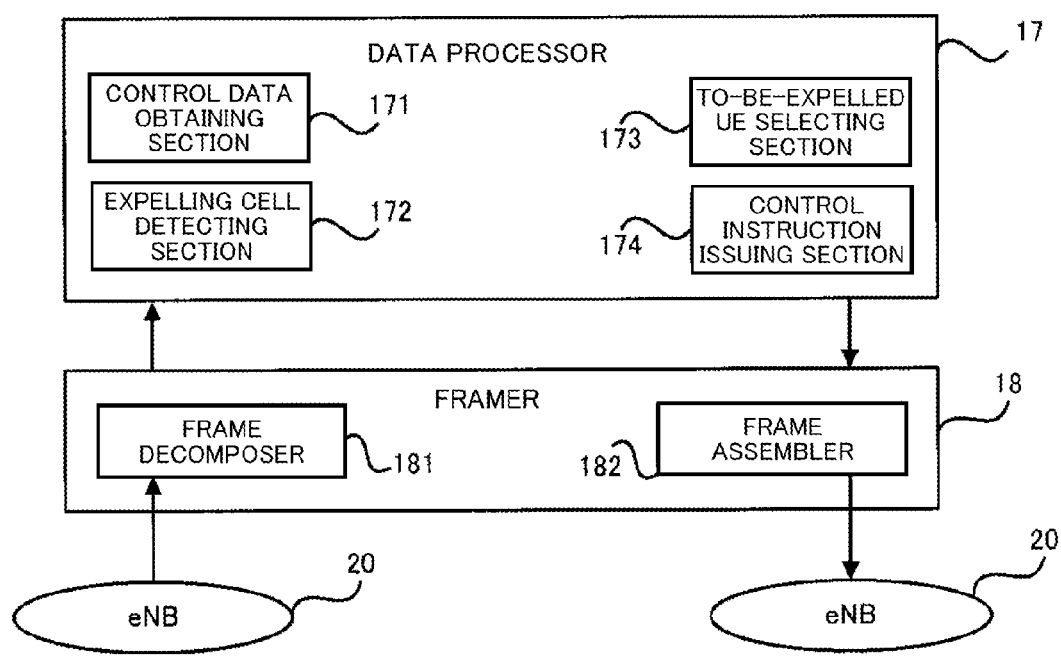
FIG. 2 is a block diagram schematically illustrating the configuration of an MME of the first embodiment.

As illustrated in FIG. 2, the MME 10 includes a data processor 17 and a framer 18.

The data processor 17 is exemplified by a Central Processing Unit (CPU) and controls the entire operation of the MME 10. The data processor 17 includes, as logical or functional processing blocks that are to be internally achieved, a control data obtaining section 171, a to-be-expelled cell detecting section 172, a to-be-expelled UE selecting section 173, and a control instruction issuing section 174.

The control data obtaining section 171 is an example of "obtaining means", and obtains control data that an eNB 20 sends through the S1 interface. Examples of the control data are accommodating-UE number data representing the number of UEs 30 being communicating with the cell 29 of the eNB 20; traffic load data representing a traffic load that the eNB 20 is processing; moving speed data representing the moving speed of each UE 30 (e.g., data representing a fading frequency); position data representing the geographical position of each UE 30; and receiving power data representing receiving power of each UE 30 (or receiving quality of each UE 30). The control data obtaining section 171 outputs the entire or part of obtained control data to the expelling cell detecting section 172 and the to-be-expelled UE selecting section 173 according to the requirement.

The expelling cell detecting section 172 detects a cell 29 from which a UE 30 is to be expelled (a cell 29 currently being communicating with a UE 30 that are to be out of communication with the cell 29). Specifically, the expelling cell detecting section 172 detects a cell 29 for which transmission power is to be adjusted to expel a UE 30. The detection of the cell 29 that is to expel a UE 30 is based on, for example, part or the entire of the control data (e.g., accommodating-UE number data and traffic load data) obtained by the control data obtaining section 171.

The to-be-expelled UE selecting section 173 is an example of "selecting means" that selects one or more UEs 30 that are to be expelled from the cell 29 detected by the expelling cell detecting section 172 among multiple UEs 30 currently being communicating with the cell 29 in question. Selection for one or more UEs 30 that are to be expelled is based on, for example, part or the entire of the control data (e.g., moving speed data, position data, and receiving power data) obtained by the control data obtaining section 171.

The control instruction issuing section 174 is an example of "controlling means" and issues a control instruction to control an eNB 20 accommodating a cell 29 detected by the expelling cell detecting section 172 such that the UEs 30 selected by the to-be-expelled UE selecting section 173 are expelled from the cell 29 to the eNB 20.

The framer 18 carries out transmission and reception of frame signals between the MME 10 and each eNB 20, and decomposes and assembles such frame signals. Specifically, the framer 18 includes a frame decomposer 181 and a frame assembler 182. The frame decomposer 181 receives frame signals that each eNB 20 transmits through the S1 interface and decomposes the received frame signals. Then the frame decomposer 181 outputs the decomposed frame signals to the data processor 17. The frame assembler 182 assembles frame signals using data output from the data processor 17 and transmits the assembled frame signals to an eNB 20 through the S1 interface.

(1-3) The Configuration of the eNB:

Description will now be made in relation to the configuration of the eNB 20 of the first embodiment with reference to FIG. 3, which is a block diagram schematically illustrating the configuration of the eNB 20 of the first embodiment.

Figure 3:
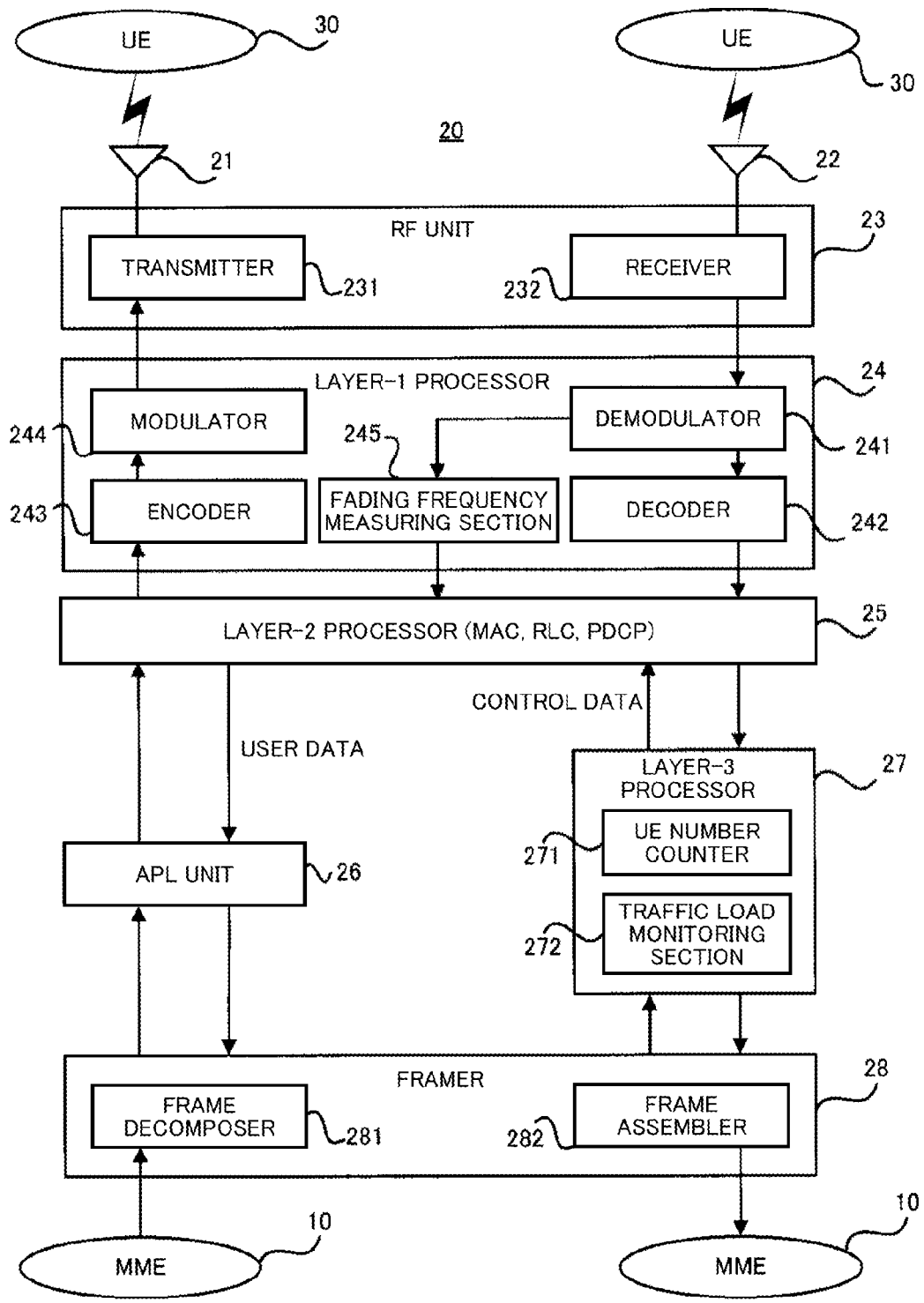
FIG. 3 is a block diagram schematically illustrating the configuration of an eNB of the first embodiment.

As illustrated in FIG. 3, the eNB 20 includes a transmission antenna 21, a reception antenna 22, a Radio Frequency (RF) unit 23, a layer-1 processor 24, a layer-2 processor 25, an application (APL) unit 26, a layer-3 processor 27, and a framer 28.

The transmission antenna 21 transmits a downlink signal output from the RF unit 23 to a UE 30.

The reception antenna 22 receives an uplink signal transmitted from a UE 30, and then outputs the received uplink signal to the RF unit 23.

In transmission of a downlink signal, the RF unit 23 performs wireless transmission processing (e.g., conversion to a high-frequency signal) on a baseband signal output from the layer-1 processor 24, and then outputs the processed baseband signal, serving as a downlink signal, to the transmission antenna 21. Conversely, in receipt of an uplink signal, the RF unit 23 performs wireless reception processing (e.g., conversion to a baseband signal) on the uplink signal received by the reception antenna 22, and then outputs the processed uplink signal, serving as a baseband signal, to the layer-1 processor 24.

The layer-1 processor 24 performs transmission and reception processing related to Layer 1 (physical layer: PHY). Specifically, the layer-1 processor 24 include a demodulator (DEM) 241, a decoder (DEC) 242, an encoder (COD) 243, a modulator (MOD) 244, and a fading frequency measuring section 245.

In receipt of an uplink signal, the demodulator 241 demodulates a baseband signal output from the RF unit 23 in conformity with the scheme of, for example, Single Carrier Frequency Division Multiple Access (SC-FDMA). Then, the demodulator 241 outputs the modulated signal to the decoder 242.

The decoder 242 performs decoding (e.g., HARQ combining, turbo decoding, and CRC verification) on a signal demodulated by the demodulator 241, and outputs the decoded signal to the layer-2 processor 25.

In transmission of a downlink signal, the encoder 243 performs encoding (e.g., turbo encoding and CRC attachment) on a signal output from the layer-2 processor 25, and then outputs the encoded signal to the modulator 244.

In transmission of a downlink signal, the modulator 244 demodulates a signal encoded in the encoder 243 in conformity with, for example, the scheme of Orthogonal Frequency Division Multiple Access (OFDMA), and then outputs the demodulated signal to the RF unit 23.

The fading frequency measuring section 245 measures a fading frequency of a UE 30, and outputs the measured fading frequency to the layer-3 processor 27 through the layer-2 processor 25. If the layer-1 processor 34 of a UE 30 includes a fading frequency measuring section 345 (see FIG. 4), the layer-1 processor 24 of an eNB 20 may omit the fading frequency measuring section 245. Conversely, if the eNB 20 includes the fading frequency measuring section 245 in the layer-1 processor 24, the layer-1 processor 34 of a UE 30 may omit the fading frequency measuring section 345.

The layer-2 processor 25 performs transmission and reception processing related to Layer 2 (Media Access Control (MAC) layer). Thereby, the layer-2 processor 25 sends and receives user data to and from the APL unit 26, and also sends and receives control data to and from the layer-3 processor 27. For example, the layer-2 processor 25 divides and combines data in conformity with the format of the sub-layer, such as MAC, Radio Link Control (RLC), and Packet Data Convergence Protocol (PDCP), and controls retransmission of data.

The APL unit 26 corresponds to a superordinate layer that processes user data. The APL unit 26 may send and receive user data to and from the MME 10 through the framer 28 and the S1 interface if required. Besides, the APL unit 26 may send and receive user data to and from another eNB 20 through the X2 interface.

The layer-3 processor 27 performs transmission and reception processing related to Layer 3 (Radio Resource Control (RRC) layer). Specifically, the layer-3 processor 27 may control wireless resource through, for example, paging, and establishing and releasing a call, or may control switching connection such as handover.

The layer-3 processor 27 of the first embodiment further includes a UE number counter 271 and a traffic load monitoring section 272. The UE number counter 271 counts the number of UEs 30 currently being communicating with the cell 29 of the eNB 20 in question. The UE number counter 271 transmits the counted number of UEs 30, which is regarded as accommodating-UE number data included in the control data, to the MME 10. The traffic load monitoring section 272 monitors the traffic load that the eNB 20 is dealing with. The traffic load monitoring section 272 transmits the monitored traffic load, which is regarded as traffic load data included in the control data, to the MME 10. In addition, the layer-3 processor 27 transmits various pieces of control data (e.g., moving speed data, position data, and receiving power data) transmitted from a UE 30 or a fading frequency (i.e., moving speed data) output from the fading frequency measuring section 245 to the MME 10.

The framer 28 carries out transmission and reception of frame signals between the MME 10 and the eNB 20, and decomposes and assembles such frame signals. Specifically, the framer 28 includes a frame decomposer 281 and a frame assembler 282. The frame decomposer 281 receives frame signals that the MME 10 transmits through the S1 interface and decomposes the received frame signals. Then the frame decomposer 281 outputs the decomposed frame signals to the APL unit 26 and/or the layer-3 processor 27. The frame assembler 282 assembles frame signals using data forwarded from the APL unit 26 and/or the layer-3 processor 27 and transmits the assembled frame signal to the MME 10 through the S1 interface.

(1-4) Configuration of the UE:

Description will now be made in relation to the configuration of a UE 30 of the first embodiment with reference to FIG. 4, which is a block diagram schematically illustrating the configuration of the UE 30 of the first embodiment.

Figure 4:
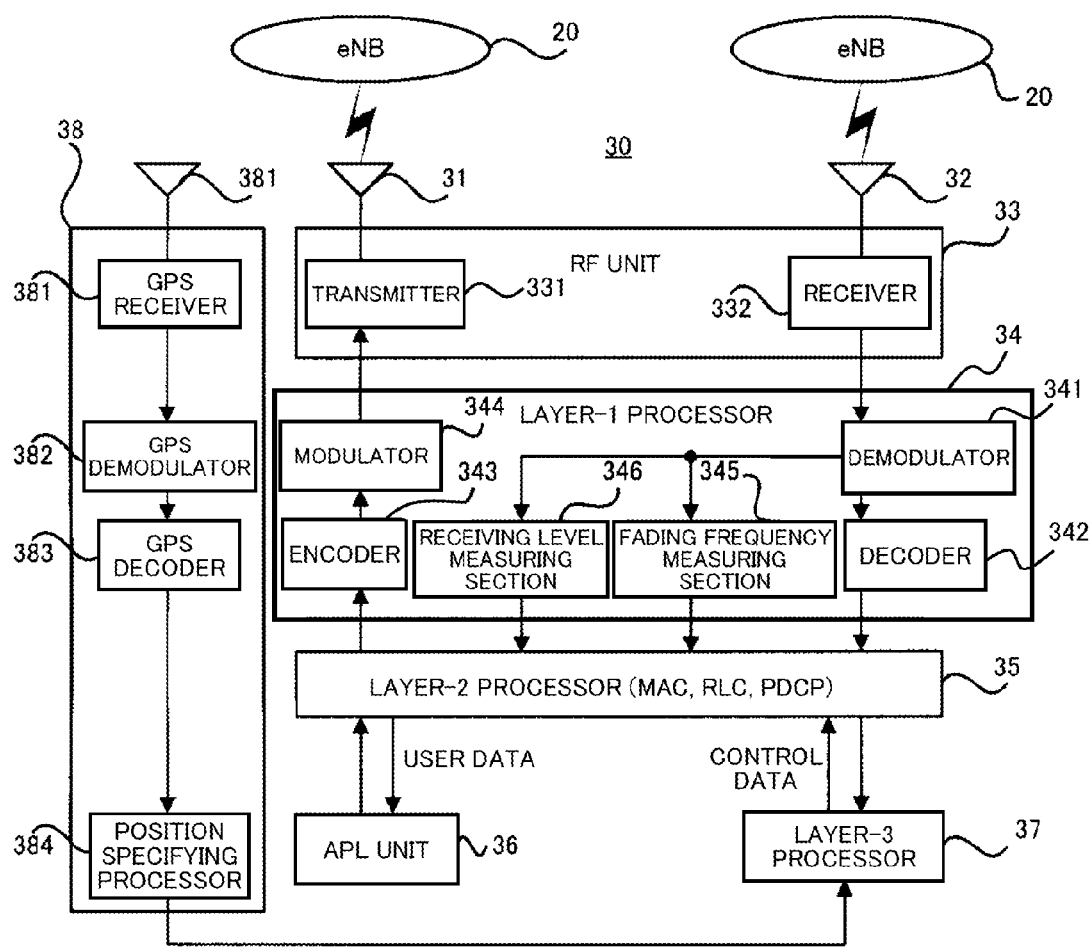
FIG. 4 is a block diagram schematically illustrating the configuration of a UE of the first embodiment.

As illustrated in FIG. 4, the UE 30 includes a transmission antenna 31, a reception antenna 32, an RF unit 33, a layer-1 processor 34, a layer-2 processor 35, an APL unit 36, a layer-3 processor 37, and a GPS processor 38.

The transmission antenna 31 transmits an uplink signal output from the RF unit 33 to an eNB 20.

The reception antenna 32 receives a downlink signal transmitted from the eNB 20 and then outputs the received downlink signal to the RF unit 33.

In transmission of an uplink signal, the RF unit 33 performs wireless transmission processing on a baseband signal output from the layer-1 processor 34, and then outputs the processed baseband signal, serving as an upwnlink signal, to the transmission antenna 31. Conversely, in receipt of a downlink signal, the RF unit 33 performs wireless reception processing on the downlink signal received by the reception antenna 32, and then outputs the processed uplink signal, serving as a baseband signal, to the layer-1 processor 34.

The layer-1 processor 34 performs transmission and reception processing related to Layer 1. For this purpose, the layer-1 processor 34 includes a demodulator 341, a decoder 342, an encoder 343, a modulator 344, a fading frequency measuring section 345, and a receiving level measuring section 346.

In reception of a downlink signal, the demodulator 341 carries out demodulation conformed with, for example, the scheme of OFDMA, and then outputs the demodulated signal to the decoder 342.

In reception of the downlink signal, the decoder 342 carries out decoding, and then outputs the decoded signal to the layer-2 processor 35.

In transmission of an uplink signal, the encoder 343 encodes a signal output from the layer-2 processor 35, and then outputs the encoded signal to the modulator 344.

In transmission of an uplink signal, the modulator 344 modulates the encoded signal in conformity with, for example, of the scheme of SC-FDMA, and then outputs the modulated signal to the RF unit 33.

The fading frequency measuring section 345 measures the fading frequency of the UE 30. The fading frequency measuring section 345 outputs the measured fading frequency to the layer-3 processor 37 via the layer-2 processor 35. Here, the fading frequency measuring section 345 may measure the fading frequency in synchronization with the timing at which a fading frequency measuring section 345 of another UE 30 measures the fading frequency. Namely, the fading frequency measuring sections 345 of multiple UEs 30 accommodated in the wireless communication system 1 may measure the respective fading frequencies at the same timing. Alternatively, the fading frequency measuring sections 345 of multiple UEs 30 currently being communicating with the same cell 29 may measure the respective fading frequencies at the same timing.

The receiving level measuring section 346 measures the receiving power at the UE 30. In the first embodiment, the receiving level measuring section 346 measures receiving power in the cell 29 that the UE 30 is currently communicating with (in communication with or connected to). In addition, the receiving level measuring section 346 may also measure receiving power in another cell 29 adjacent to the cell 29 that the UE 30 is being communicating with (i.e., another cell 29 is a peripheral cell of the cell 29 that the UE 30 is currently communicating with, but is not communicating with the UE 30). The receiving level measuring section 346 outputs the measured receiving power to the layer-3 processor 37 through the layer-2 processor 35. Alternatively, the receiving level measuring section 346 may measure the receiving quality of the UE 30 in addition to or as substitute for measuring of the receiving power of the UE 30. Examples of the receiving quality of the UE 30 are a Signal to Interface Ratio (SIR), a Bit Error Rate (BER), and a Block Error Rate (BLER). The receiving level measuring section 346 may measure the receiving power in synchronization with the timing at which the receiving level measuring section 346 included in another UE 30 measures a receiving power. Namely, the receiving level measuring sections 346 of multiple UEs 30 accommodated in the wireless communication system 1 may measure the respective receiving powers at the same timing. Alternatively the receiving level measuring sections 346 of multiple UEs 30 being communicating with the same cell 29 may measure the respective receiving powers at the same timing.

The layer-2 processor 35 performs transmission and reception related to Layer 2 similarly to the layer-2 processor 25 (see FIG. 3) described above.

The APL unit 36 corresponds to a superordinate layer that processes the user data similarly to the APL unit 26 (see FIG. 3) described above.

The layer-3 processor 37 performs transmission and reception related to Layer 3 similarly to the layer-3 processor (see FIG. 3) described above. In the first embodiment, the layer-3 processor 37 further transmits various pieces of the control data (e.g., the fading frequency (moving speed data) output from the fading frequency measuring section 345, the receiving power (receiving power data) output from the receiving level measuring section 346, and position data output from the GPS processor 38) to the eNB 20.

The GPS processor 38 receives the GPS carrier waves from GP satellites and thereby obtains position data representing the geographical position (e.g., in the latitude and the longitude) of the UE 30. The GPS processor 38 may obtain the GPS data in synchronization with the timing at which the GPS processor 38 included in another UE 30 obtains GPS data. Namely, the GPS processors 38 of multiple UEs 30 accommodated in the wireless communication system 1 may obtain respective GPS data at the same timing. Alternatively the GPS processors of multiple UEs 30 being communicating with the same cell 29 may obtain the respective GPS data at the same timing.

The GPS processor 38 includes a GPS receiver 381, a GPS demodulator 382, a GPS decoder 383, and a position specifying processor 384.

The GPS receiver 381 receives GPS carrier waves transmitted from GPS satellites. The GPS receiver 381 outputs the GPS data contained in the received GPS carrier waves to the GPS demodulator 382.

The GPS demodulator 382 demodulates the GPS data output from the GPS receiver 381, and then outputs the demodulated GPS data to the GPS decoder 383.

The GPS decoder 383 decodes the GPS data output from the GPS demodulator 382, and then outputs the decoded GPS data to the position specifying processor 384.

The position specifying processor 384 specifies the geographical position indicated by the GPS data output from the GPS decoder 383 using the GPS data, and then outputs the specified geographical position to the layer-3 processor 37.

(1-5) Operation of the MME:

Next, description will now be made in relation to the operation performed by the MME 10 included in the wireless communication system 1 of the first embodiment with reference to FIG. 5, which is a flow diagram denoting an example of a succession of procedural steps performed by the MME 10.

Figure 5:
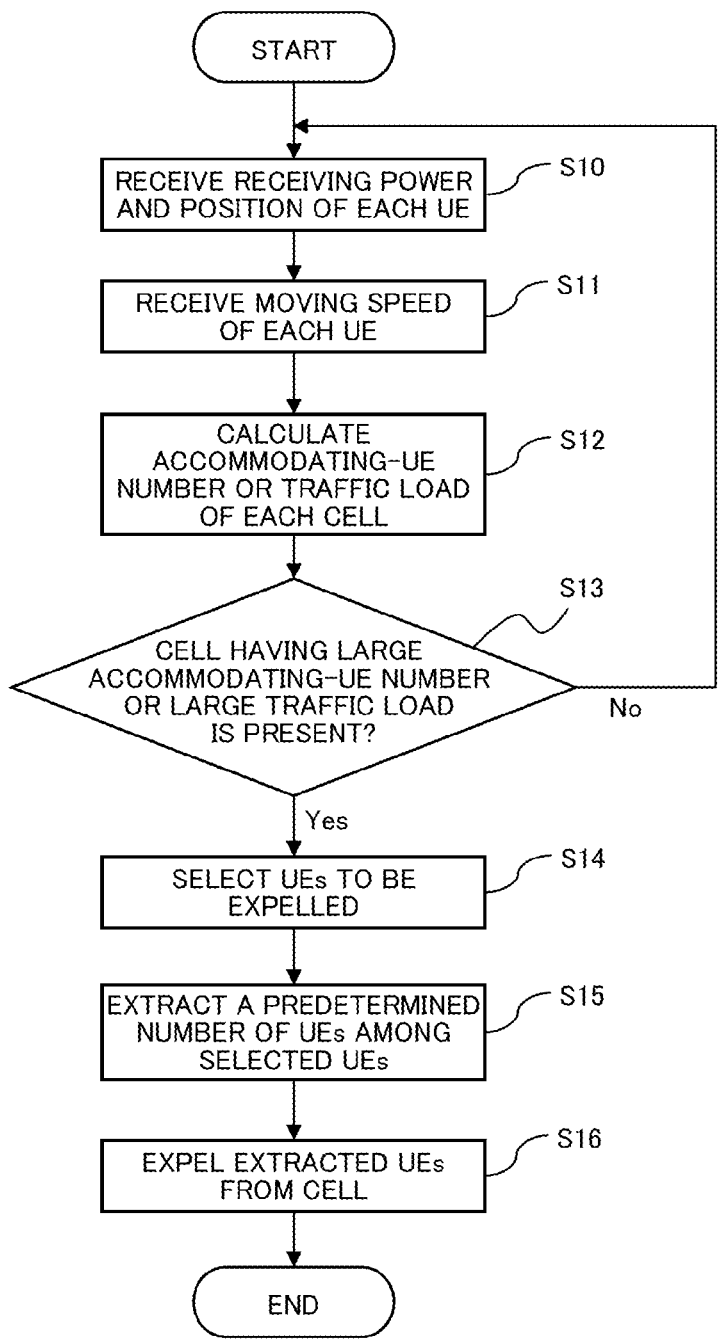
FIG. 5 is a flow diagram denoting an example of a succession of procedural steps performed by an MME of the first embodiment.

As denoted in FIG. 5, the control data obtaining section 171 included in the MME 10 obtains the receiving power data and the position data that are transmitted from a UE 30 via an eNB 20 (step S10). In addition, the control data obtaining section 171 obtains the moving speed data transmitted from the UE 30 via the eNB 20 (step S11). The control data obtaining section 171 outputs the receiving power data, the position data, and the moving speed data that are obtained to the to-be-expelled UE selecting section 173.

The control data obtaining section 171 further obtains at least one of the accommodating-UE number data or the traffic load data that are transmitted from the eNB 20, and then outputs the obtained data (the accommodating-UE number data and/or the traffic load data) to the expelling cell detecting section 172.

The expelling cell detecting section 172 calculates at least one of the accommodating-UE number and the traffic load of each of the cells 29 of the eNBs 20 under the control of the MME (step S12). The calculation of at least one of the accommodating-UE number and the traffic load in step S12 is based on at least one of the accommodating-UE number data and the traffic load data output from the control data obtaining section 171.

Next, the expelling cell detecting section 172 determines whether a cell 29 currently being communicating with a large number of UEs 30 (cell having a large accommodating-UE number) is present (step S13). Specifically, the expelling cell detecting section 172 may determine whether a cell 29 having an accommodating-UE number larger than a first predetermined threshold TH_Cell_1 (for detecting a cell on the basis of the accommodating-UE number) is present. An example of the first threshold TH_Cell_1 is the upper limit of the number of UEs being communicating with a cell 29 that enables the cell 29 to stably communicate with the UEs in the cell 29. Alternatively, the expelling cell detecting section 172 may determine whether a cell having an accommodating-UE number relatively larger than those of cells 29 (i.e., peripheral cells 29) adjacent to the cell 29 in question is present. If a cell 29 having an accommodating-UE number larger than the first threshold TH_Cell_1 is present or a cell 29 having an accommodating-UE number relatively larger than those of the adjacent cells 29 is present, the expelling cell detecting section 172 may determine that a cell 29 having a large accommodating-UE number is present. On the other hand, if a cell 29 having an accommodating-UE number larger than the first threshold TH_Cell_1 is absent or a cell 29 having an accommodating-UE number relatively larger than those of the adjacent cells 29 is absent, the expelling cell detecting section 172 may determine that a cell 29 having a large accommodating-UE number is not present.

Otherwise, the expelling cell detecting section 172 may determine whether a cell 29 having a large traffic load is present in addition to or as substitute for the determination as to whether a cell 29 having a large accommodating-UE number is present (step S13). Specifically, the expelling cell detecting section 172 may determine whether a cell 29 having a traffic load larger than a second predetermined threshold TH_Cell_2 (for detecting a cell on the basis of a traffic load) is present. An example of the second threshold TH_Cell_2 is the upper limit of a traffic load of a cell 29 that enables the cell 29 to stably communicate with the UEs in the cell 29. Alternatively, the expelling cell detecting section 172 may determine whether a cell 29 having a traffic load relatively lager than those of cells (i.e., peripheral cells 29) adjacent to the cell 29 in question is present. If a cell 29 having a traffic load larger than a second predetermined threshold TH_Cell_2 is present or a cell 29 having a traffic load relatively lager than those of cells adjacent to the cell 29 in question is present, the expelling cell detecting section 172 may determine that a cell 29 having a large traffic load is present. On the other hand, if a cell 29 having a traffic load larger than a second predetermined threshold TH_Cell_2 is absent or a cell 29 having a traffic load relatively lager than those of cells adjacent to the cell 29 in question is absent, the expelling cell detecting section 172 may determine that a cell 29 having a large traffic load is not present.

If the expelling cell detecting section 172 determines that a cell 29 having a large accommodating-UE number is absent and also determines that a cell 29 having a large traffic load is absent as the result of step S13 (No route in step S13), the MME 10 repeats the procedure of step S10 and the subsequent steps.

If the expelling cell detecting section 172 determines that a cell 29 having a large accommodating-UE number is present or determines that a cell 29 having a large traffic load is present as the result of step S13 (YES route in step S13), the to-be-expelled UE selecting section 173 selects one or more candidate UEs 30 that are to be expelled from the cell 29 having a large accommodating-UE number or a large traffic load among the UEs 30 being communicating with the cell 29 (step S14).

Figure 6:
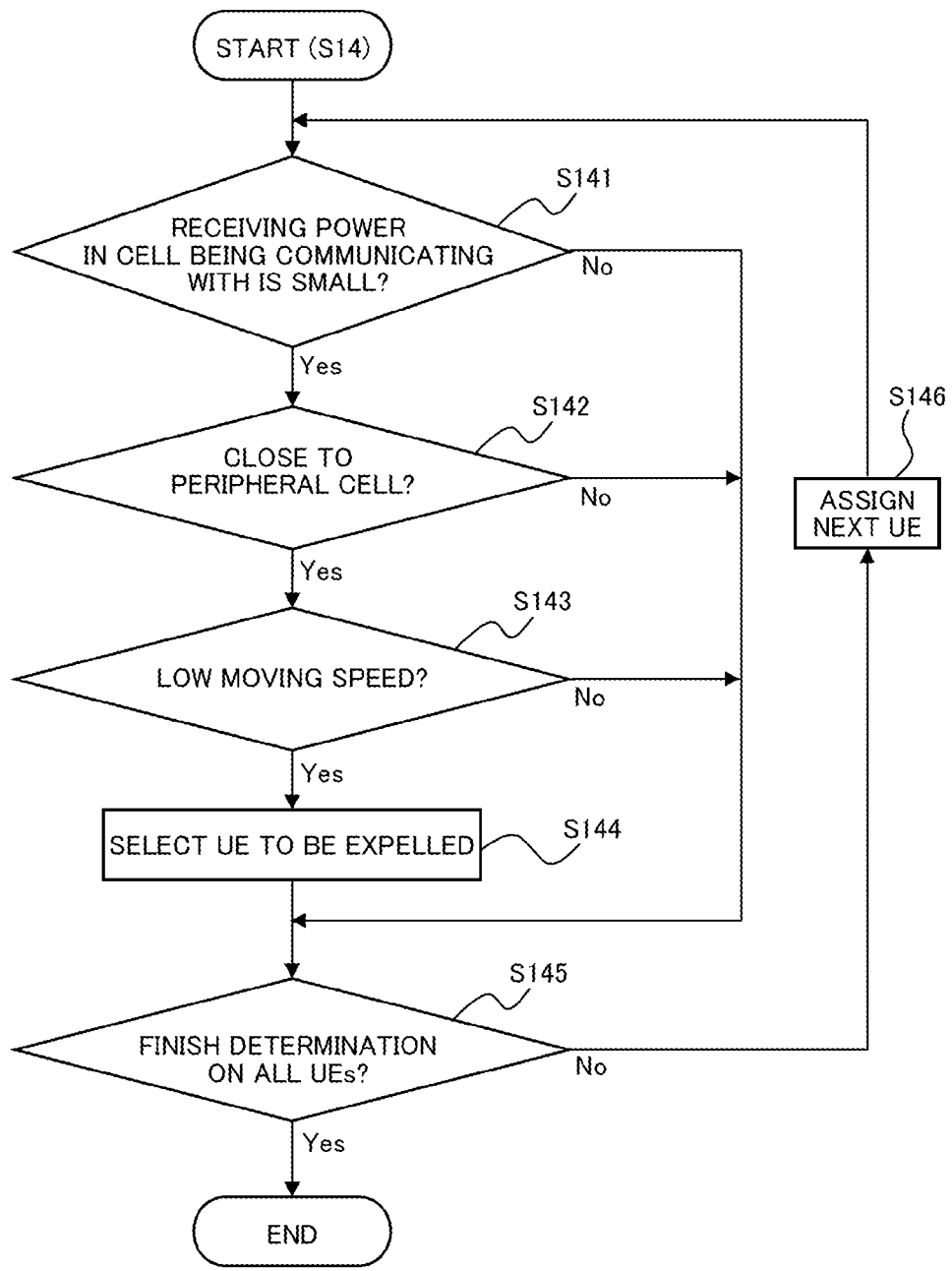
FIG. 6 is a flow diagram denoting an example of a succession of procedural steps performed by an MME of the first embodiment.
Figure 7:
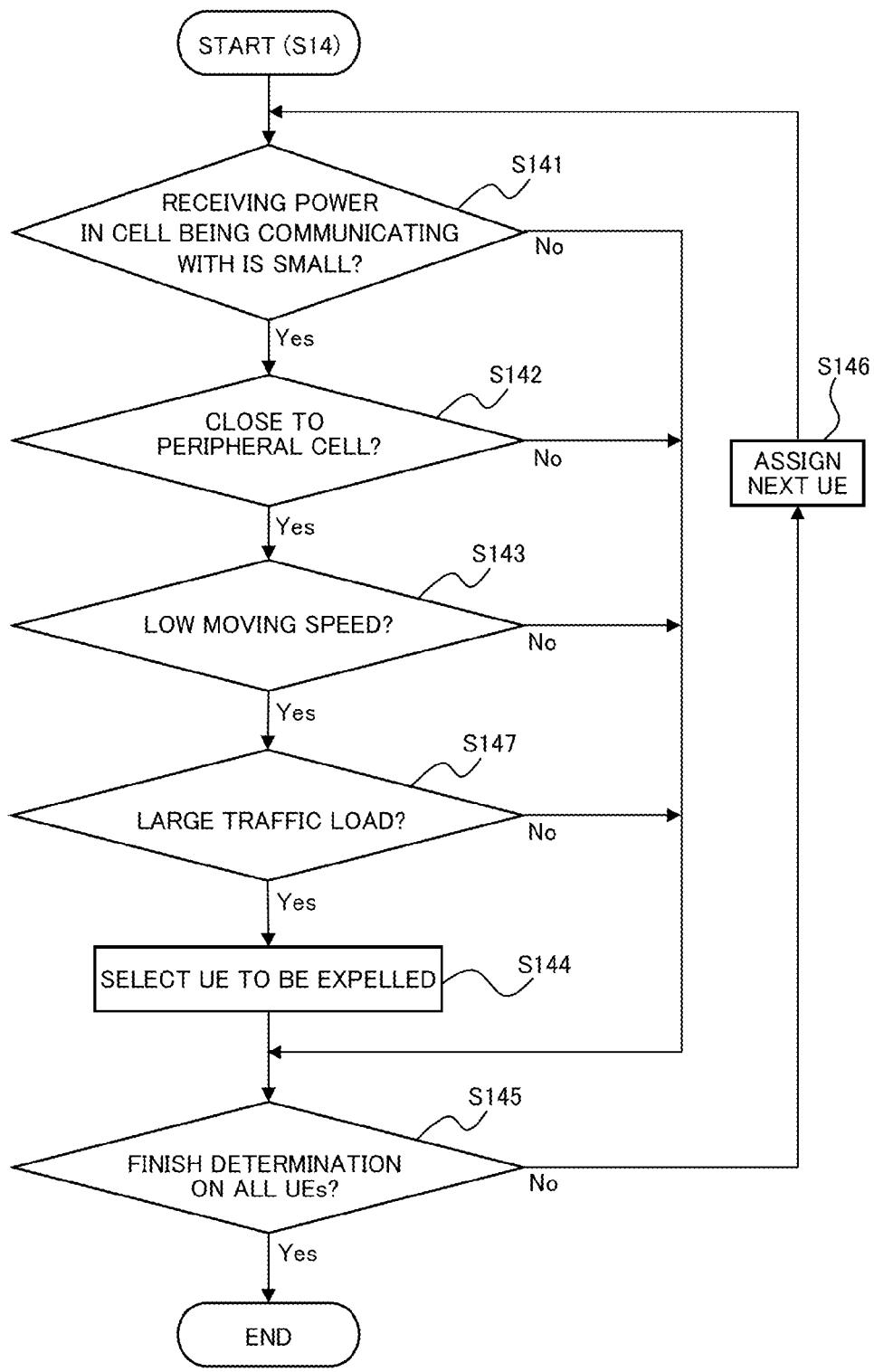
FIG. 7 is a flow diagram denoting a succession of procedural steps of selecting an UE to be expelled from a cell of step S14 of FIG. 6.

Here, description will now be made in relation to a detailed procedure (step S14 of FIG. 5) of selecting one or more candidate UEs 30 to be expelled from the cell 29 with reference to FIGS. 6 and 7. FIG. 6 is a flow diagram illustrating a first example of a succession of procedural steps of selecting one or more candidate UEs 30 to be expelled from the cell 29 in step S14 of FIG. 5; and FIG. 7 is a flow diagram illustrating a second example of a succession of procedural steps of selecting one or more candidate UEs 30 to be expelled from the cell 29 in step S14 of FIG. 5.

In the first example of the procedure denoted in FIG. 6, the to-be-expelled UE selecting section 173 determines whether a receiving power of a certain UE 30 among multiple UEs 30 currently being communicating with a cell 29 determined to have a large accommodating-UE number or a large traffic load has a small receiving power in the cell 29 (step S141). The determination based on a receiving power in step S141 is made with reference to the receiving power data output from the control data obtaining section 171. Specifically, the to-be-expelled UE selecting section 173 may made the above determination by determining whether a receiving power of the UE 30 in the cell 29 being communicating with is smaller than a third predetermined threshold TH_UE_1 (for selecting a UE on the basis of a receiving power from the cell 29 being communicating with). An example of the third threshold TH_UE_1 is the lower limit (or a tolerance) of a receiving power that enables the UE 30 to stably communicate with the corresponding cell 29. Alternatively, the to-be-expelled UE selecting section 173 may made the above determination by determining whether a UE 30 among the UEs 30 being communicating with a cell 29 determined to have a large accommodating-UE number and a large traffic load has a receiving power relatively smaller than those of the remaining UEs 30 being unselected and being communicating with the same cell 29. If a certain UE 30 has a receiving power in the cell 29 being communicating with smaller than the third threshold TH_UE_1 or relatively smaller than those of the remaining UEs 30, the UE 30 may be determined to have a small receiving power in the cell 29 being being communicating with. On the other hand, if a certain UE 30 has a receiving power in the cell 29 being communicating with equal to or larger than the third threshold TH_UE_1 or relatively larger than those of the remaining UEs 30, the UE 30 may be determined not to have a small receiving power from the cell 29 being communicating with.

If the to-be-expelled UE selecting section 173 determines that the receiving power of the UE 30 in the cell 29 being communicating with is not small as the result of the determination of step S141 (No route in step S141), the UE 30 is excluded from candidate UE 30 that are to be expelled. In this case, the to-be-expelled UE selecting section 173 determines whether all the UEs 30 accommodated in the cell 29 determined to have a large accommodating-UE number or a large traffic load underwent the determination of the procedure from step S141 to step S143 (step S145).

If the to-be-expelled UE selecting section 173 determines that all the UEs 30 in the cell 29 underwent the procedure of from step S141 to step S143 in step S145 (Yes route in step S145), the to-be-expelled UE selecting section 173 terminates the procedure.

On the other hand, if the to-be-expelled UE selecting section 173 does not determine that all the UEs 30 underwent the procedure of from step S141 to step S143 in step S145 (No route in step S145), the to-be-expelled UE selecting section 173 assigns another UE 30 that are to be subjected to the procedure of from step S141 to S143 the next (step S146). After that, the to-be-expelled UE selecting section 173 repeats the procedure of step S141 and subsequent steps on the assigned UE 30.

If the to-be-expelled UE selecting section 173 determines that the receiving power of the UE 30 in the cell 29 being communicating with is small as the result of the determination of step S141 (Yes route in step S141), the to-be-expelled UE selecting section 173 further determines whether the UE 30 determined to have a small receiving power is located in the vicinity of a cell (i.e., peripheral cell 29) adjacent to the cell 29 that the UE 30 in question is communicating with (step S142). The determination related to the position of the UE 30 in step S142 is based on the position data output from the control data obtaining section 171. Specifically, the determination related to the position of the UE 30 may be made by determining whether the distance of the UE 30 from each peripheral cell 29 is a fourth predetermined threshold TH_UE_2 (for selecting a UE on the basis of the position of the UE) or more. An example of the fourth threshold TH_UE_2 is the upper limit (or a tolerance) of a distance that allows the UE 30 to properly accomplish a handover to a peripheral cell 29 without interruption. Alternatively, the to-be-expelled UE selecting section 173 may determine whether the UE 30 being selected is relatively nearer to a peripheral cell than the remaining UEs 30 being unselected and being communicating with the cell 29 determined to have a larger accommodating-UE number or a large traffic load. If the distance of the selected UE 30 from each peripheral cell 29 is the fourth threshold TH_UE_2 or less or the selected UE 30 is relatively closer to a peripheral cell 29 than the remaining unselected UEs 30, the selected UE 30 may be determined to be positioned in the vicinity of the peripheral cell 29. On the other hand, if the distance of the selected UE 30 from each peripheral cell 29 is more than the fourth threshold TH_UE_2 or the selected UE 30 is not relatively closer to a peripheral cell 29 than the remaining unselected UEs 30, the selected UE 30 may be determined not to be positioned in the vicinity of the peripheral cell 29.

If the selected UE 30 is determined not to be positioned in the vicinity of peripheral cells 29 in step S142 (No route in step S142), the selected UE 30 is excluded from candidate for expelling. In this case, the to-be-expelled UE selecting section 173 determines whether all the UEs 30 currently being communicating with the cell 29 determined to have a large accommodating-UE number or a large traffic load underwent the determination of from step S141 to step S143 (step S145). If the to-be-expelled UE selecting section 173 determines that all the UEs 30 underwent the procedure of from step S141 to step S143, the to-be-expelled UE selecting section 173 terminates the procedure. Conversely, if the to-be-expelled UE selecting section 173 does not determine that all the UEs 30 underwent the procedure of from step S141 to step S143, the to-be-expelled UE selecting section 173 repeats the procedure of step S141 and subsequent steps on another UE 30 assigned the next.

On the other hand, if the selected UE 30 is determined to be located in the vicinity of a peripheral cell 29 in step S142 (Yes route in step S142), the to-be-expelled UE selecting section 173 further determines whether the moving speed of the selected UE 30 is low (step S143). The determination based on the moving speed in step S143 is made with reference to the moving speed data output from the control data obtaining section 171. Specifically, the to-be-expelled UE selecting section 173 may determine whether the moving speed of the selected UE 30 is less than a fifth predetermined threshold TH_UE_3 (for selecting a UE on the basis of the moving speed of the UE). An example of the fifth threshold TH_UE_3 is a moving speed that causes a UE 30 to return to the cell 29 shortly after the UE 30 has been expelled from the same cell 29 or a moving speed that causes the UE 30 to leave the cell 29 without expelling the UE 30 from the same cell 29. Alternatively, the to-be-expelled UE selecting section 173 may determine whether the moving speed of the selected UE 30 accommodated in a cell 29 determined to have a large accommodating-UE number or a large traffic load is relatively lower than those of the remaining UEs 30 being unselected and being communicating with the same cell 29. If the selected UE 30 travels at a moving speed lower than the fifth threshold TH_UE_3 or travels at a moving speed lower than those of the remaining UEs 30, the to-be-expelled UE selecting section 173 may determine that the moving speed of the selected UE 30 is low. Conversely, if the selected UE 30 travels at a moving speed not lower than the fifth threshold TH_UE_3 or travels at a moving speed not lower than those of the remaining UEs 30, the to-be-expelled UE selecting section 173 may determine that the moving speed of the selected UE 30 is not low.

In the first embodiment, since the moving speed data contains the fading frequency, the to-be-expelled UE selecting section 173 preferably converts the fading frequency to a moving speed using a predetermined calculating expression.

If the moving speed of the selected UE 30 is determined not to be low (that is, determined to be high) in step S143 (No route in step S143), the selected UE 30 is excluded from candidate UEs for expelling. In this case, the to-be-expelled UE selecting section 173 determines whether all the UEs currently being communicating with the cell 29 determined to have a large accommodating-UE number or a large traffic load underwent the determination of from step S141 to step S143 (step S145). If the to-be-expelled UE selecting section 173 determines that all the UEs 30 underwent the procedure of from step S141 to step S143, the to-be-expelled UE selecting section 173 terminates the procedure. Conversely, if the to-be-expelled UE selecting section 173 does not determine that all the UEs 30 underwent the procedure of from step S141 to step S143, the to-be-expelled UE selecting section 173 repeats the procedure of step S141 and subsequent steps on another UE 30 assigned the next.

On the other hand, if determining that the moving speed of the UE 30 is low in step S143 (Yes route in step S143), the to-be-expelled UE selecting section 173 selects the UE 30 as a candidate UE for expelling (step S144).

Then, the to-be-expelled UE selecting section 173 determines whether all the UEs being communicating with the cell 29 determined to have a large accommodating-UE number or a large traffic load underwent the determination of from step S141 to step S143 (step S145). If all the UEs 30 underwent the procedure of from step S141 to step S143, the to-be-expelled UE selecting section 173 terminates the procedure. Conversely, if not all the UEs 30 underwent the procedure of from step S141 to step S143, the to-be-expelled UE selecting section 173 repeats the procedure of step S141 and subsequent steps on another UE 30 assigned the next.

The second example of the procedure denoted in FIG. 7 is different from the first example in the point that, if the moving speed of the UE 30 is determined to be low (Yes route in step S143), the to-be-expelled UE selecting section 173 further determines whether the traffic load of the UE 30 is large. Specifically, in the second example, if the moving speed of the selected UE 30 is determined to be low (Yes route in step S143), the to-be-expelled UE selecting section 173 further determines whether the traffic load of the same UE 30 is large (heavy) (step S147). The determination related to the traffic load in step S147 is based on the traffic load data output from the control data obtaining section 171. Specifically, the to-be-expelled UE selecting section 173 may make the above determination by determining whether the traffic load of the UE 30 is larger than a sixth predetermined threshold TH_UE_4 (for selecting a UE on the basis of the traffic load on the UE). An example of the sixth threshold TH_UE_4 is the upper limit (or a tolerance) of a traffic load that ensures stable communication or that ensures stable communication without adversely affecting the remaining UEs 30. Alternatively, the to-be-expelled UE selecting section 173 may make the determination by determining whether the traffic load of the selected UE 30 communicating with a cell 29 determined to have a large accommodating-UE number or a large traffic load is relatively larger than those of the remaining UEs 30 being unselected and being communicating with the same cell 29. If the traffic load of the selected UE 30 is larger than the sixth threshold TH_UE_4 or is relatively larger than those of the remaining UEs 30, the traffic load of the selected UE 30 may be determined to be large. Conversely, if the traffic load of the selected UE 30 is not larger than the sixth threshold TH_UE_4 or is not relatively larger than those of the remaining UEs 30, the traffic load of the selected UE 30 may be determined not to be large.

If the traffic load of the selected UE 30 is determined not to be large in step S147 (No route in step S147), the selected UE 30 is excluded from candidate UEs 30 for expelling. In this case, the to-be-expelled UE selecting section 173 determines whether all the UEs being communicating with the cell 29 determined to have a large accommodating-UE number or a large traffic load underwent the determination of from step S141 to step S147 (step S145). If all the UEs 30 underwent the procedure of from step S141 to step S147, the to-be-expelled UE selecting section 173 terminates the procedure. Conversely, if not all the UEs 30 underwent the procedure of from step S141 to step S147, the to-be-expelled UE selecting section 173 repeats the procedure of step S141 and subsequent steps on another UE 30 assigned the next.

Conversely, if the moving speed of the UE 30 is determined to be low in step S143 (Yes route in step S143), the to-be-expelled UE selecting section 173 selects the same UE 30 as a candidate UE that is to be expelled (step S144).

Referring back to FIG. 5, the to-be-expelled UE selecting section 173 extracts one or more UEs 30 that are to be actually expelled from the cell 29 among the candidate UEs 30 selected in step S14 (step S15). Specifically, the to-be-expelled UE selecting section 173 selects all UEs 30 each of which has small receiving power, is located in the vicinity of a peripheral cell, and has a low moving speed as a candidate UE that is to be expelled. Here, the traffic load of the eNB 20 may come to be appropriate even if all the candidate UEs 30 are not expelled. In other words, there is a possibility that the traffic load of the eNB 20 comes to be appropriate even if only part of UEs 30 selected as candidates for expelling is expelled. For the above, the to-be-expelled UE selecting section 173 of the first embodiment extracts one or more UEs 30 from the selected candidates such that the traffic load of the eNB 20 comes to be proper. Alternatively, the to-be-expelled UE selecting section 173 may be configured to expel all the UEs 30 selected as candidates for expelling.

In succession, the control instruction issuing section 174 issues, to the eNB 20 having the cell 29 detected by the to-be-expelled cell detecting section 172, an instruction that controls the eNB 20 such that one or more UEs 30 extracted by the to-be-expelled UE selecting section 173 are expelled from the cell 29 (step S16). For example, the control instruction issuing section 174 may issue a control instruction to adjust the transmission power of the respective cells 29 that eNBs 20 has (i.e., an eNB 20 accommodating the cell 29 detected by the expelling cell detecting section 172 and one or more eNBs 20 accommodating peripheral cells 29 adjacent to the detected cell 29) to the eNBs 20. An example of the control instruction to adjust the transmission power instructs an eNB 20 having the cell 29 from which one or more UEs 30 are to be expelled (i.e., a cell 29 that is to communicate with a reduced number of UEs 30 after the forthcoming expelling) to lower the transmission power of the shared channel of the eNB 20. Alternatively, the control instruction to adjust the transmission power may instruct an eNB 20 having a cell 29 which one or more UEs 30 expelled are to enter (i.e., a cell 29 that is to communicate with an increased number of UEs 30 after the forthcoming expelling) to increase the transmission power of the shared channel of the eNB 20. Further alternatively, the control instruction to adjust the transmission power may instruct an eNB 20 having the cell 29 from which one or more UEs 30 are to be expelled to increase the allowable receiving level of the eNB 20, or may instructs an eNB 20 having a cell 29 which one or more UEs 30 to be expelled are to enter to decrease the allowable receiving level of the eNB 20.

The above explanation assumes that one or more UEs are expelled through adjusting the transmission power of eNBs 20 (or cells 29). Alternatively, one or more UEs 30 may be expelled by another manner exemplified by handover of the UEs 30 from the cell 29 to expel the UEs 30 to a cell to newly communicate with the expelled UEs 30. Still alternatively, one or more UEs 30 may be expelled through adjusting, for example, tilt angles of the transmission antennas 21 and the reception antennas 22 included in the respective eNBs 20.

Various manners of expelling one or more UEs 30 explained above will now be further detailed with reference to FIGS. 8 and 9. FIG. 8 is a schematic diagram illustrating a manner of expelling one or more UE 30 by the MME 10 of the first embodiment; and FIG. 9 is a schematic diagram illustrating a manner of expelling one or more UEs 30 by an MME of a comparative example, regardless of the moving speeds of the respective UEs 30 (that is, without carrying out step S143 of FIG. 6).

Figure 8A:
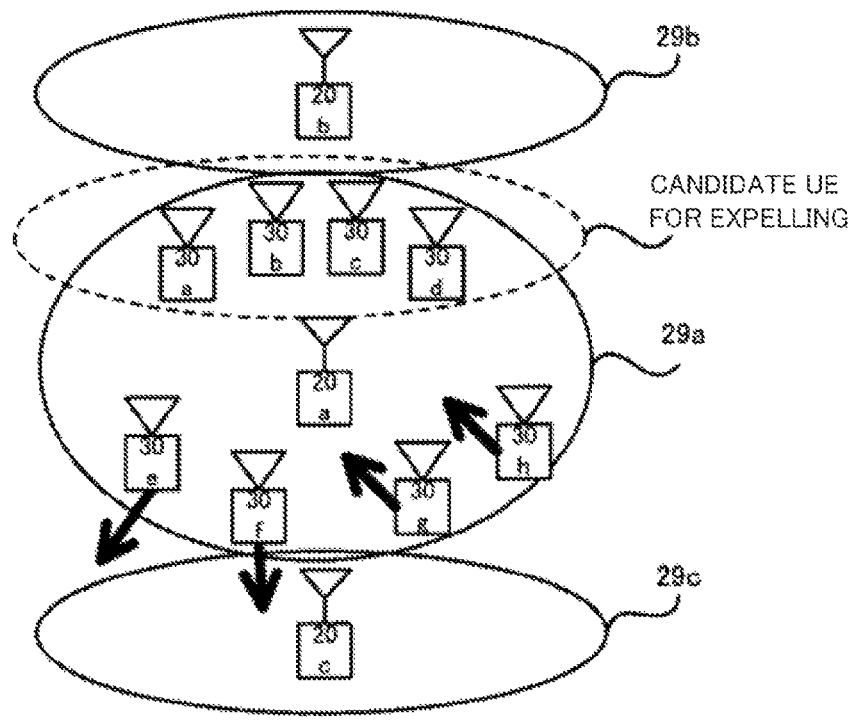
FIGS. 8A and 8B is a schematic diagram illustrating an example of expelling an UE by an MME of the first embodiment.

Referring to FIG. 8A, description will now be made in relation to an example in which a cell 29a communicating with UEs 30a, 30b, 30c, and 30d having relatively low moving speeds and UEs 30e, 30f, 33g, and 30h having relatively high moving speeds is detected to be a cell 29 from which one or more UEs 30 are to be expelled. This example further assumes that the cell 29a of the eNB 20a is adjacent to the cell 29b of the eNB 20b and also the cell 29c of the eNB 20c. In FIG. 8A, arrows attached to the UEs 30e, 30f, 30g, 30h indicate the directions in which the respective UEs are moving.

Figure 8B:
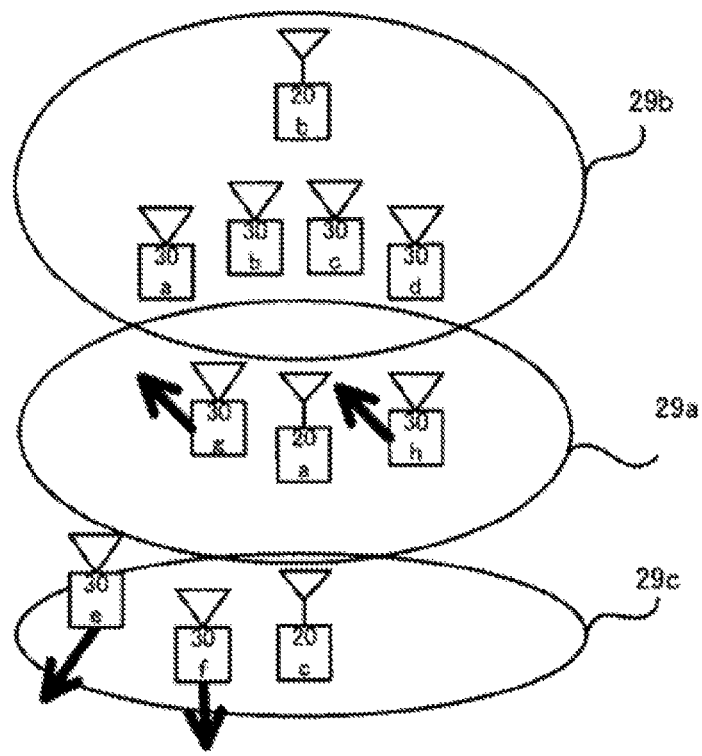

The MME 10 of the first embodiment excludes the UEs 30e, 30f, 30g, and 30h relatively high in moving speed from candidates for expelling. In other words, as illustrated in FIG. 8A, the MME 10 of the first embodiment selects the UEs 30a, 30b, 30c, and 30d relatively low in moving speed as candidates for expelling. Accordingly, as illustrated in FIG. 8B, the first embodiment adjusts the transmission powers of the cells 29a and 29b such that the UEs 30a, 30b, 30c, and 30d relatively low in moving speed are expelled from the cell 29a and then enter the peripheral cell 29b. The UEs 30e and 30f, which have relatively high moving speeds in the direction of leaving the cell 29a, spontaneously leave the cell 29a irrespective of expelling UEs 30 from the cell 29a under the control of the MME 10. In the meantime, the UEs 30g and 30h, which has relatively high moving speeds in the direction toward the center of the cell 29a, stay in the cell 29a irrespective of expelling UEs 30 from the cell 29a under the control of the MME 10.

Figure 9A:
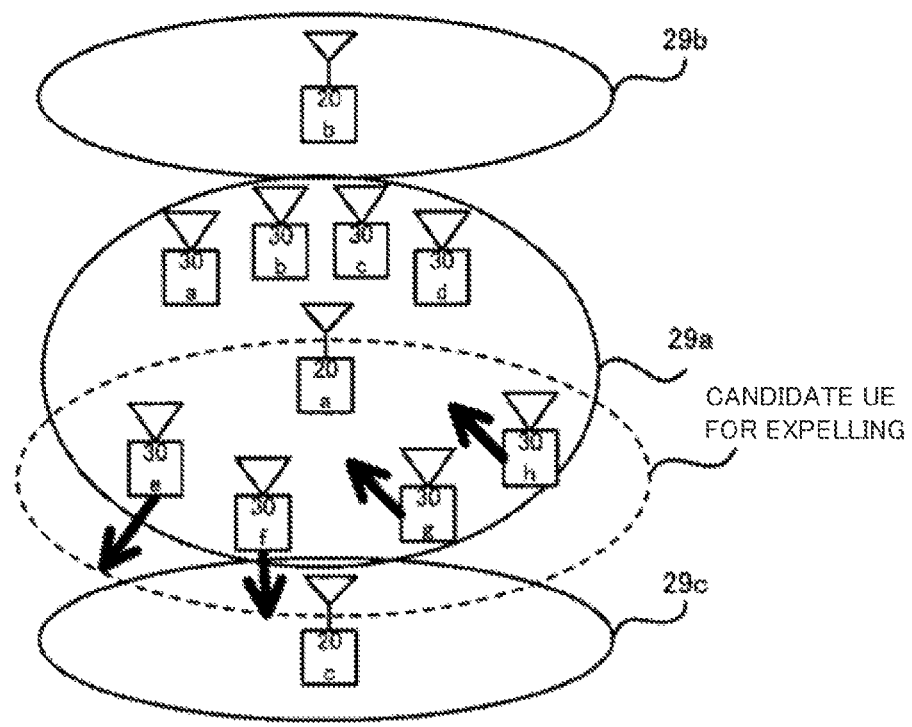
FIGS. 9A and 9B is a schematic diagram illustrating an example of expelling an UE by an MME regardless of moving speed of the UE (i.e., without carrying out step S143 of FIG. 6) of a comparative example.
Figure 9B:
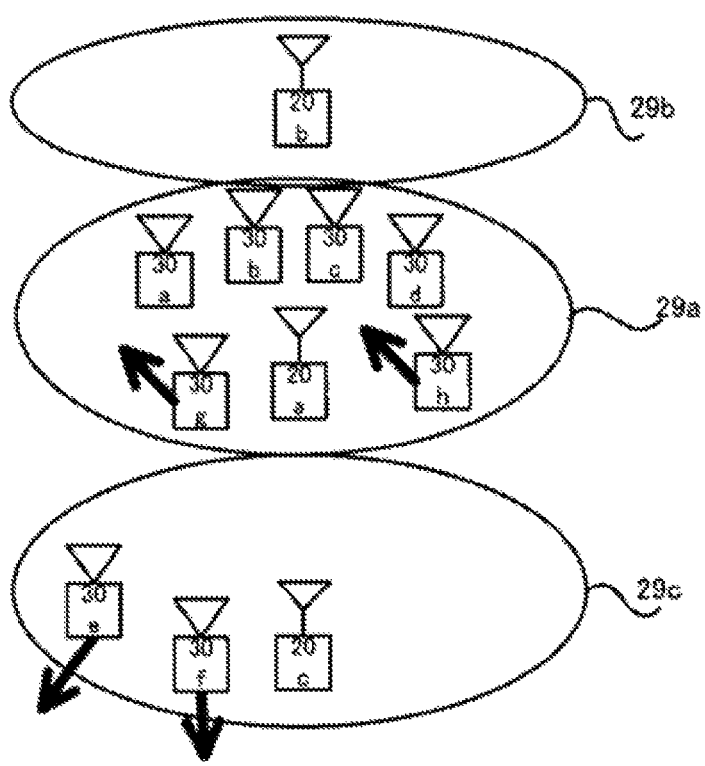

As illustrated in FIG. 9A, a MME of a comparative example, which selects one or more UEs regardless of the moving speeds of the respective UEs, has a possibility of selecting the UEs 30e, 30f, 30g, and 30h relatively high in moving speed as candidates for expelling. Accordingly, as illustrated in FIG. 9B, the comparative example adjusts the transmission powers of the cells 29a and 29c such that the UEs 30e, 30f, 30g, and 30h relatively high in moving speed are expelled from the cell 29a and then enter the peripheral cell 29c. However, since the UEs 30e and 30f are moving at relatively high speeds in the direction of leaving the cell 29a, these UEs are expected, for their high moving speeds, to spontaneously leave the cell 29a soon irrespective of expelling UEs 30 from the cell 29a under the control of the MME 10. On the other hand, since the UEs 30g and 30h are moving at relatively high speed in the direction toward the center of the cell 29a, theses UEs are expected, for their high moving speeds, to return inside the cell 29a after being expelled from the cell 29a under the control of the MME. Such behavior of the UEs 30e, 30f, 30g, and 30h has a possibility of impairing the advantage of expelling UEs 30 and making the expelling useless.

In the first embodiment, the UEs 30e, 30f, 30g, and 30h relatively high in moving speed are therefore excluded from candidates for expelling. In other words, the UEs 30a, 30b, 30c, and 30d relatively low in moving speed are selected as candidate for expelling. Advantageously, the first embodiment is able to completely or almost avoid the inconvenience of the above comparative example. For the above, the first embodiment expels one or more UEs 30 from the cell 29, considering the respective moving speed of UEs 30, so that appropriate UEs are expelled.

The first embodiment is capable of selecting a UE 30 having a moving speed absolutely low (i.e., lower than the fifth threshold TH_UE_3) or relatively low (i.e., lower than those of the remaining UEs 30) as a candidate for expelling. In other words, the first embodiment is capable of expelling one or more UEs 30, properly considering the respective moving speeds of the UEs 30.

Alternatively, the first embodiment is capable of selecting one or more UEs 30 as candidates for expelling, considering the respective receiving powers of the UEs 30. For example, a UE 30 having a small receiving power in the cell 29 being communicating with as a candidate for expelling. In other words, one or more UEs 30 receiving powers from the cell 29 being communicating with are not small are excluded from candidates for expelling. This manner makes it possible to expel a UE 30 which has a high possibility of improving the receiving power thereof when moves inside a peripheral cell 29 (i.e., when establishing new communication with the peripheral cell 29) from the cell 29 being currently communicating with the UE 30.

The first embodiment is capable of selecting a UE 30 having a receiving power from the cell 29 being communicating with absolutely small (i.e., lower than the third threshold TH_UE_1) or relatively small (i.e., smaller than those of the remaining UEs 30) as a candidate for expelling. For this, the first embodiment is capable of expelling one or more UEs 30, properly considering the respective receiving powers of the UEs 30.

The first embodiment is capable of selecting one or more UEs 30 as candidates for expelling, considering the respective positions of the UEs 30 (for example, whether each UE 30 is positioned in the vicinity of a peripheral cell 29). For example, a UE 30 positioned in the vicinity of a peripheral cell 29 is selected as a candidate for expelling. In other words, a UE 30 not positioned in the vicinity of a peripheral cell 29 is excluded from candidates for expelling. Advantageously, this makes it possible to expel a UE 30 which is easily moved to a peripheral cell 29 from the cell 29 being communicating with.

The first embodiment is capable of selecting a UE 30 being located at a position absolutely in the vicinity of a peripheral cell 29 (i.e., the position having a distance from a peripheral cell 29 less than the fourth threshold TH_UE_2) or relatively low (i.e., the position having a distance to the peripheral cell 29 nearer than those of the remaining UEs 30) as a candidate for expelling. In other words, the first embodiment is capable of expelling one or more UEs 30, properly considering the respective positions of the UEs 30.

The first embodiment is capable of selecting one or more UEs 30 as candidates for expelling, considering the respective traffic load of the UEs 30. For example, a UE 30 having a large traffic load is selected as a candidate for expelling. In other words, it is possible to exclude a UE 30 not having a large traffic load from candidates for expelling. This can expel one or more UEs 30 from a cell 29 to which traffic is being concentrated, so that the load on the cell 29 can be appropriately reduced, that is, traffic among multiple cells 29 can be uniformlized.

In the above description, the moving speed data indicating a moving speed uses a fading frequency. Alternatively, the moving speed can be indicated by another parameter capable of directly or indirectly indicating a moving speed. For example, the number of times that a UE 30 moved between eNBs 20 (i.e., the number of times that the UE 30 moved between cells 29) may be used as the moving speed data. If the number of times that a UE 30 moved between eNBs 20 is larger, it is possible to estimated that the moving speed of the same UE 30 is higher.

(2) Second Embodiment

Next, a wireless communication system according to a second embodiment will now be described with reference to FIG. 10. The wireless communication system of the second embodiment is different in the configuration of the UE 30 from the wireless communication system 1 of the first embodiment. Accordingly, the following description will focus only on the differences in the configuration from the first embodiment for simplification. Parts and element common in the first and second embodiments are represented by the same reference numbers and detailed description thereof is omitted here.

Figure 10:
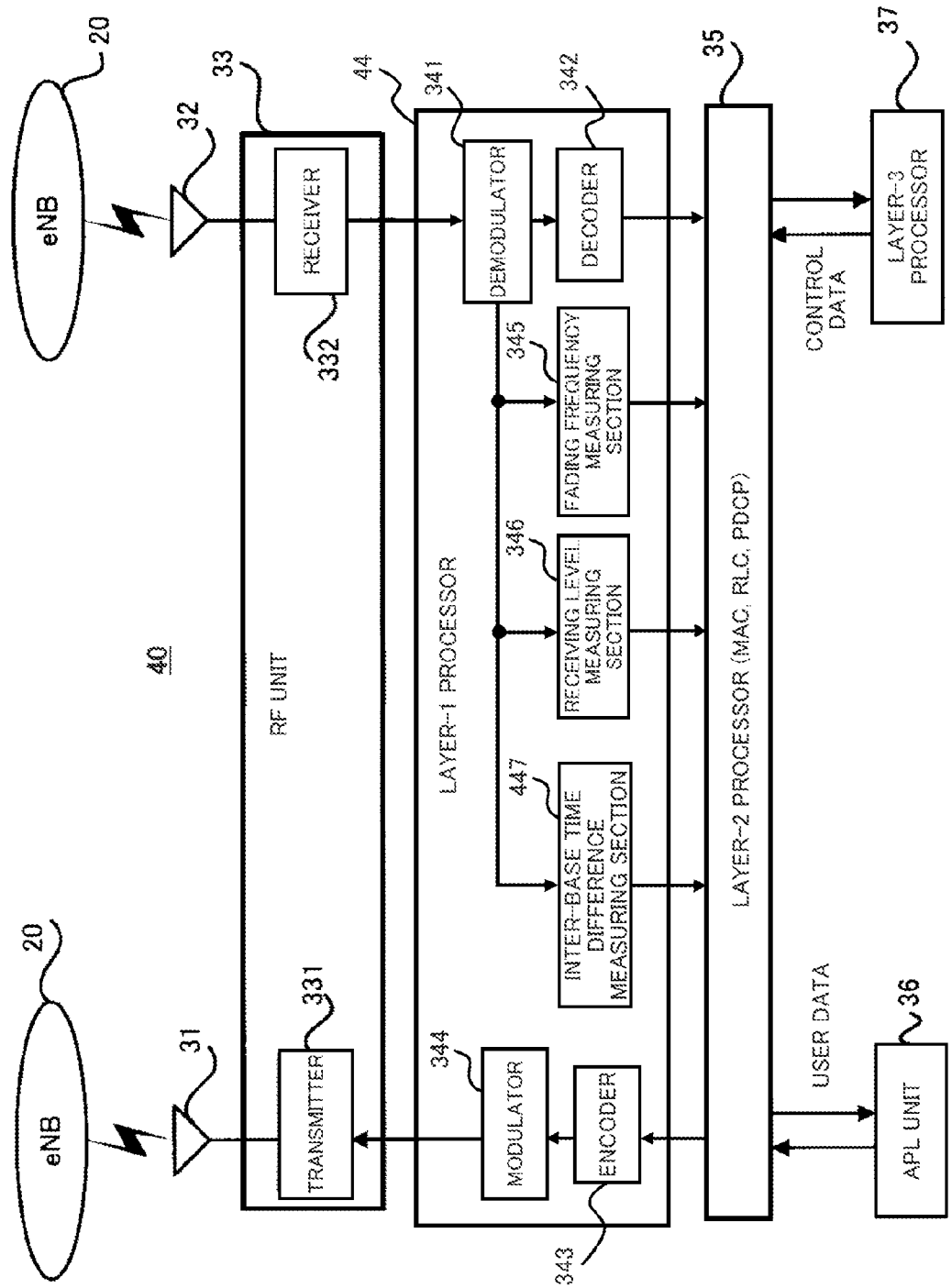
FIG. 10 is a block diagram schematically illustrating the configuration of an UE of a second embodiment.

As illustrated in FIG. 10, a UE 40 of the second embodiment includes a transmission antenna 31, a reception antenna 32, an RF unit 33, a layer-1 processor 44, a layer-2 processor 35, an APL unit 36, and a layer-3 processor 37 similarly to the UE 30 of the first embodiment. The layer-1 processor 44 included in the UE 40 include a demodulator 341, a decoder 342, an encoder 343, a modulator 344, a fading frequency measuring section 345, and a receiving level measuring section 346, similarly to the layer-1 processor 34 of the UE 30 of the first embodiment.

The UE 40 of the second embodiment is different in not including the GPS processor 38 from the UE 30 of the first embodiment and is also different in including an inter-base time difference measuring section 447 in the layer-1 processor 44 from the UE 30 of the first embodiment.

The inter-base time difference measuring section 447 measures a time difference of signals received from two or more eNBs 20. Example of the difference is a difference of timing of receiving a pilot signal or a synchronous signal. The inter-base time difference measuring section 447 outputs time difference data indicating the measured time difference to the layer-3 processor 37 via the layer-2 processor 35. The layer-3 processor 37 transmits the received time difference data, serving as control data, to the eNB 20.

The layer-3 processor 27 included in the eNB 20 transmits the received time difference data, serving as control data, to the MME 10. The to-be-expelled UE selecting section 173 included in the MME 10 uses the time difference data as the position data. This means that the second embodiment measures the position of a UE 30 using a time difference of receiving signals at the UE 30 from two or more eNBs 20 as substitute for measuring the position of the UE 30 by means of the GPS. This alternative configuration also brings the above effects.

Besides, the UE 30 of the second embodiment may omit the GPS processor 38, which relatively simplifies the configuration of the UE 30.

(3) Third Embodiment

Description will now be made in relation to a wireless communication system according to a third embodiment with reference to FIGS. 11-13. The wireless communication system of the third embodiment is different in configuration of the UE 30 and function of the MME 10 from the wireless communication system 1 of the first embodiment. Accordingly, the following description will focus only on the differences in the configuration from the first embodiment for simplification. Parts and elements common in the first and third embodiments are represented by the same reference numbers and detailed description thereof is omitted here.

(3-1) Configuration of the UE:

The configuration of a UE 50 included in the wireless communication system of the third embodiment will now be described with reference to FIG. 11, which is a block diagram schematically illustrating the configuration of the UE 50 of the third embodiment.

Figure 11:
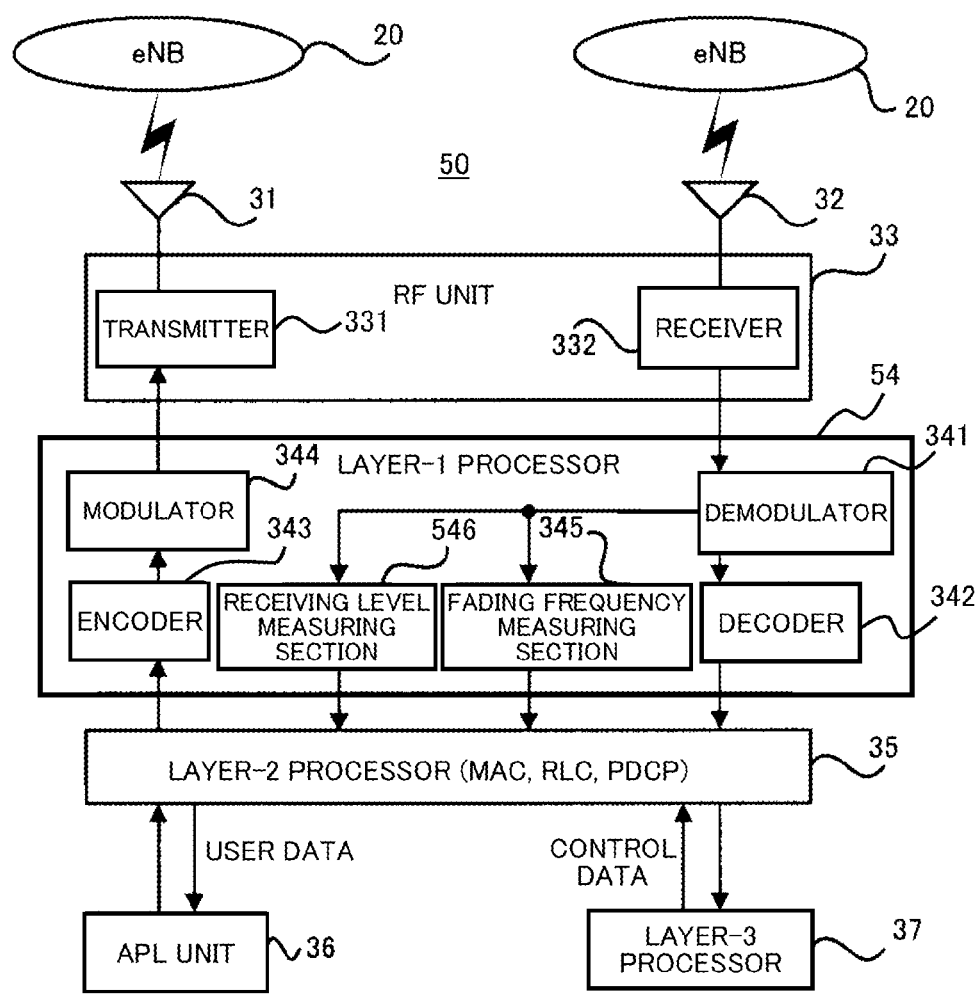
FIG. 11 is a block diagram schematically illustrating the configuration of an UE of a third embodiment.

As illustrated in FIG. 11, the UE 50 of the third embodiment is different from the UE 30 of the first embodiment in the point of not including the GPS processor 38. The remaining configuration of the UE 50 of the third embodiment may be the same as that of the UE 30 of the first embodiment.

(3-2) Description of the Function:

The function possessed by the MME 10 included in the wireless communication system of the third embodiment will now be described with reference to FIG. 12, which denotes an example of a succession of procedural steps performed by the MME 10 of the third embodiment.

Figure 12:
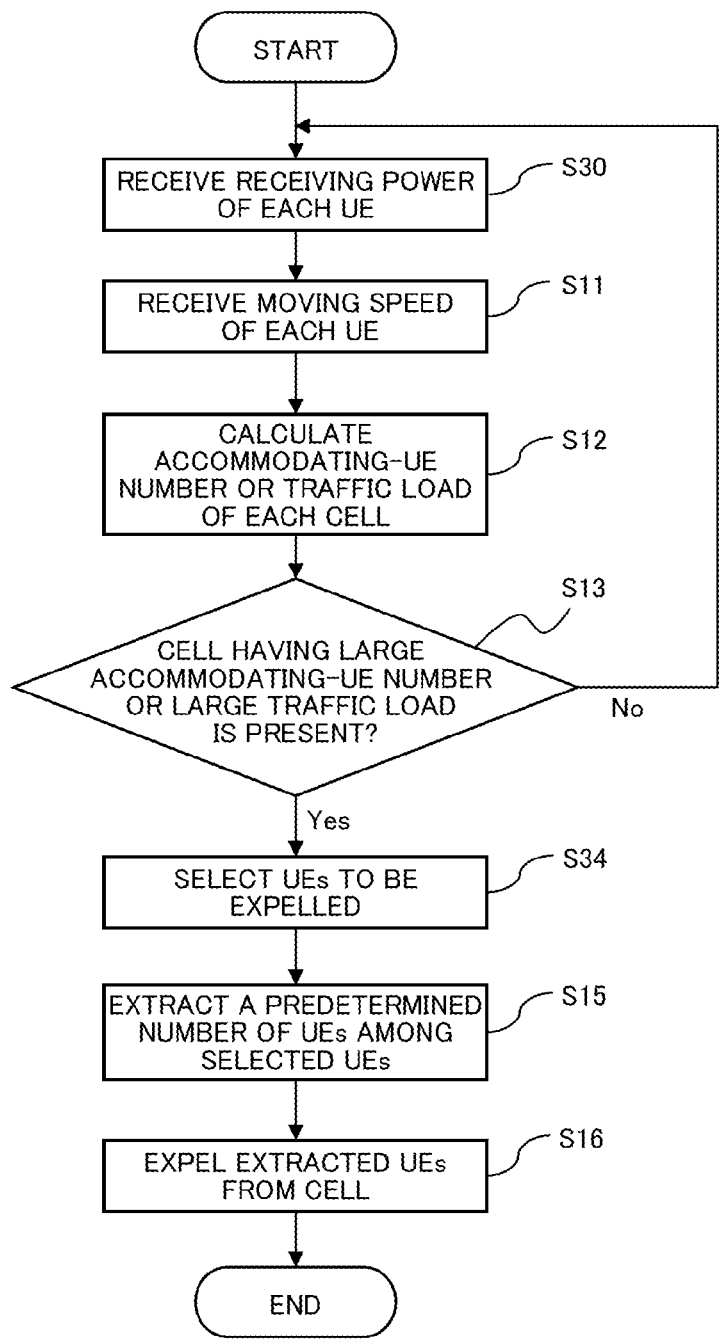
FIG. 12 is a flow diagram denoting an example of a succession of procedural steps performed by an MME of the third embodiment.

As illustrated in FIG. 12, the control data obtaining section 171 included in the MME 10 obtains the receiving power data and the moving speed data that are transmitted from a UE 50 via an eNB 20 (steps S30 and S11). Namely, the third embodiment is different from the first embodiment in the point that the control data obtaining section 171 does not obtain the position data. Furthermore, the receiving power data of the third embodiment includes the receiving power from the cell 29 being communicating with the UE 50 and the receiving powers from one or more cells 29 (peripheral cells 29) adjacent to the cell 29 being communicating with.

The expelling cell detecting section 172 calculates at least one of the accommodating-UE number and the traffic load of the cell 29 of each of the eNBs 20 under the control of the MME (step S12), and also determines whether a cell 29 having a large accommodating-UE number is present (step S13).

If the expelling cell detecting section 172 determines that a cell 29 having a large accommodating-UE number is absent or determines that a cell 29 having a large traffic load is absent as the result of step S13 (No route in step S13), the MME 10 repeats the procedure of step S30 and the subsequent steps.

In contrast, if the expelling cell detecting section 172 determines that a cell 29 having a large accommodating-UE number is present or also determines that a cell 29 having a large traffic load is present as the result of step S13 (YES route in step S13), the to-be-expelled UE selecting section 173 selects one or more candidate UEs 30 that are to be expelled from the cell 29 determined to have a large accommodating-UE number or a large traffic load among the UEs 30 being communicating with the cell 29 (step S34).

Here, description will now be made in relation to a detailed procedure (step S34 of FIG. 12) of selecting one or more candidate UEs 30 to be expelled from the cell with reference to FIG. 13, which is a flow diagram illustrating an example of a succession of procedural steps of selecting one or more candidate UEs 30 to be expelled from the cell 29 in step S34 of FIG. 12.

As illustrated in FIG. 13, the to-be-expelled UE selecting section 173 determines whether a receiving power of a certain UE 30 among multiple UEs 30 being communicating with a cell 29 determined to have a large accommodating-UE number and a large traffic load has a small receiving power in the cell 29 (step S141).

If the to-be-expelled UE selecting section 173 determines that the receiving power of the UE 30 in the cell 29 being communicating with is not small as the result of the determination of step S141 (No route in step S141), the UE 30 is excluded from candidate UEs 30 for expelling. In this case, the to-be-expelled UE selecting section 173 determines whether all the UEs 30 being communicating with the cell 29 determined to have a large accommodating-UE number or a large traffic load underwent the determination of from step S141 to step S143 (step S145). If all the UEs 30 underwent the procedure of from step S141 to step S143, the to-be-expelled UE selecting section 173 terminates the procedure. If not all the UEs 30 underwent the determination of from step S141 to step S143, the to-be-expelled UE selecting section 173 repeats the procedure of step S141 and subsequent steps on a UE 30 newly assigned.

If the to-be-expelled UE selecting section 173 determines that the receiving power of the UE 30 in the cell 29 being communicating with is small as the result of the determination of step S141 (Yes route in step S141), the to-be-expelled UE selecting section 173 determines whether the UE 30 in question has a large receiving power from a peripheral cell 29 (step S342). The determination related to the receiving poser of the UE 30 in step S342 is based on the receiving power data output from the control data obtaining section 171. Specifically, the to-be-expelled UE selecting section 173 may determine whether the receiving power of the UE 30 from the peripheral cell 29 is larger than a seventh predetermined threshold TH_UE_5 (for selecting a UE on the basis of the receiving power from a peripheral cell 29). Alternatively, the to-be-expelled UE selecting section 173 may determine whether the UE 30 being selected has a relatively large receiving power from the peripheral cell 29 than those from the peripheral cell 29 of the remaining UEs 30 being unselected and being communicating with the cell 29 determined to have a larger accommodating-UE number and a large traffic load receives. If the receiving power of the UE 30 in question from the peripheral cell 29 is larger than the seventh threshold TH_UE_5 or is relatively larger than those of the remaining UEs 30, the receiving power of the UE 30 from the peripheral cell 29 may be determined to be large. Conversely, if the receiving power of the UE 30 in question from the peripheral cell 29 is equal to or samller than the seventh threshold TH_UE_5 or is relatively smaller than those of the remaining UEs 30, the receiving power of the UE 30 from the peripheral cell 29 may be determined not to be large.

If the receiving power of the UE 30 from the peripheral cell 29 is determined not to be large in step S342 (No route in step S342), the UE 30 is excluded from candidates for expelling. In this case, the to-be-expelled UE selecting section 173 determines whether all the UEs 30 communicating with the cell 29 underwent the determination of from step S141 to step S143 (step S145). If all the UEs 30 underwent the procedure of from step S141 to step S143, the to-be-expelled UE selecting section 173 terminates the procedure. If not all the UEs 30 underwent the determination of from step S141 to step S143, the to-be-expelled UE selecting section 173 repeats the procedure of step S141 and subsequent steps on a UE 30 newly assigned.

Conversely, if the receiving power of the UE 30 from the peripheral cell 29 is determined to be large in step S342 (Yes route in step S342), the to-be-expelled UE selecting section 173 further determines whether the moving speed of the UE 30 is low (step S143).

If the moving speed of the UE 30 is determined not to be low (in other words, determined to be high) in step S143 (No route in step S143), the UE 30 in question is excluded from candidates for expelling. In this case, the to-be-expelled UE selecting section 173 determines whether all the UEs 30 communicating with the cell 29 underwent the determination of from step S141 to step S143 (step S145). If all the UEs 30 underwent the procedure of from step S141 to step S143, the to-be-expelled UE selecting section 173 terminates the procedure. If not all the UEs 30 underwent the determination of from step S141 to step S143, the to-be-expelled UE selecting section 173 repeats the procedure of step S141 and subsequent steps on a UE 30 newly assigned.

On the other hand, if the moving speed of the UE 30 is determined to be low in step S143 (Yes route in step S143), the to-be-expelled UE selecting section 173 selects the UE 30 in question as a candidate for expelling (step S144).

After that, the to-be-expelled UE selecting section 173 determines whether all the UEs 30 communicating with the cell 29 underwent the determination of from step S141 to step S143 (step S145). If all the UEs 30 underwent the procedure of from step S141 to step S143, the to-be-expelled UE selecting section 173 terminates the procedure. If not all the UEs 30 underwent the determination of from step S141 to step S143, the to-be-expelled UE selecting section 173 repeats the procedure of step S141 and subsequent steps on a UE 30 newly assigned.

Referring back to FIG. 12, the to-be-expelled UE selecting section 173 extracts one or more UEs 30 that are to be actually expelled from the cell 29 among the candidates UEs 50 selected in step S34 (step S15). In succession, the control instruction issuing section 174 issues, to the eNB 20, an instruction that controls the eNB 20 such that the UEs 30 extracted by the to-be-expelled UE selecting section 173 are expelled from the cell 29 detected by the expelling cell detecting section 172 (step S16).

As detailed above, the third embodiment expels a UE 30, considering the moving speed and the receiving power of the UE 30, similarly to the first embodiment.

The third embodiment is capable of excluding a UE 30 not having a large receiving power from a peripheral cell 29 from candidates for expelling. Here, such a UE 50 not having a large receiving power from a peripheral cell 29 is estimated to not be positioned in the vicinity of the peripheral cell 29. Namely, in the third embodiment, a determination as to whether a UE 30 is positioned in the vicinity of a peripheral cell 29 is made on the basis of the receiving power of the same UE 30 in the peripheral cell 29 as substitute for step S142 in FIG. 6, which makes the same determination on the basis of the position data. Consequently, the third embodiment can appropriately expel the UE 30 similarly to the first embodiment even if the UE 30 does not transmit the position data thereof to the MME 10.

Considering the above technical advantages of the third embodiment, the seventh threshold TH_UE_5 used in determination on the receiving power from a peripheral cell 29 is preferably set to be an appropriate value based on the relationship between the distance from the boundary of the peripheral cell 29 a the receiving power.

The present invention should by no means be limited to the foregoing embodiments, and various changes and modifications can be suggested without departing from the scope and the sprit derived from the claims and the description. Such modified wireless communication system, management station, and a method for managing are involved the technical scope of the present invention.

The management station detailed above is capable of making a mobile terminal out of communication with a cell of a wireless base station, considering the moving speed of the mobile terminal. Advantageously, this can exclude a mobile terminal moving at a relatively high moving speed from candidates for making out of communication of the cell currently being communicating with the mobile terminal. Accordingly, such a mobile terminal made out of communication of a cell has a low possibility of returning into the cell. Besides, it is possible to eliminate the need for making a mobile terminal that is likely to spontaneously move to the outside the cell (i.e., leave the cell) without controlling the corresponding wireless station out of communication with the cell. Consequently, it is possible to avoid inconvenience of making the advantage of controlling wireless base stations less effective or useless, so that the mobile terminal is made out of the range of the cell being under the control of the wireless base station.

The management station and a method of managing detailed above brings the same effects as those of the above wireless communication system.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although an embodiment of the present inventions has been described in detail, it should be understood that the various changes, substitutions, and alterations could be made hereto without departing from the spirit and scope of the invention.

What is claimed is:

1. A wireless communication system comprising:
   a wireless base station having a cell accommodating a plurality of mobile terminals; and
   a management station that controls the wireless base station, wherein
   the management station comprises at least one processor configured to
      obtain, for each of the plurality of mobile terminals, speed data indicating a moving speed of the mobile terminal,
      select one or more mobile terminals each having a moving speed, indicated by the speed data, satisfying a first criterion among the plurality of mobile terminals, and
      control to decrease a transmission power of the wireless base station having the cell accommodating the selected mobile terminals or to increase an allowable receiving level of the wireless base station.

2. The wireless communication system according to claim 1, wherein a mobile terminal having a moving speed satisfying the first criterion is at least one of (i) a mobile terminal having a moving speed, indicated by the speed data, being less than a first threshold, and (ii) a mobile terminal having a moving speed, indicated by the speed data, being less than those of mobile terminals that are not selected.

3. The wireless communication system according to claim 1, wherein the at least one processor is further configured to:
   obtain, for each of the plurality of mobile terminals, first power data indicating a receiving power of the mobile terminal in the cell currently being communicating with the mobile terminal; and
   select one or more mobile terminals each having a moving speed, indicated by the speed data, satisfying the first criterion, and also a receiving power in the cell currently being communicating with the mobile terminal, indicated by the first power data, satisfying a second criterion among the plurality of mobile terminals.

4. The wireless communication system according to claim 3, wherein a mobile terminal having a receiving power satisfying the second criterion is at least one of (i) a mobile terminal having a receiving power in the cell currently being communicating with the mobile terminal, indicated by the first power data, being less than a second threshold, and (ii) a mobile terminal having a receiving power in the cell currently being communicating with the mobile terminal, indicated by the first power data, being less than those of mobile terminals that are not selected.

5. The wireless communication system according to claim 3, wherein the at least one processor is further configured to:
   obtain, for each of the plurality of mobile terminals, second power data indicating a receiving power of the mobile terminal from a peripheral cell currently not being communicating with the mobile terminal but being located in the vicinity of the mobile terminal; and
   select one or more mobile terminals each having a moving speed, indicated by the speed data, satisfying the first criterion; a receiving power in the cell currently being communicating with the mobile terminal, indicated by the first power data, satisfying the second criterion; a receiving power from the peripheral cell currently not being communicating with the mobile terminal, indicated by the second power data, satisfying a third criterion among the plurality of mobile terminals.

6. The wireless communication system according to claim 5, wherein a mobile terminal having a receiving power from the peripheral cell satisfying the third criterion is at least one of (i) a mobile terminal having a receiving power from the peripheral cell currently not being communicating with the mobile terminal, indicated by the second power data, being more than a third threshold, and (ii) a mobile terminal having a receiving power from the peripheral cell currently not being communicating with the mobile terminal, indicated by the second power data, more than those of mobile terminals that are not selected.

7. The wireless communication system according to claim 1, wherein the at least one processor is further configured to:
   obtain, for each of the plurality of mobile terminals, position data indicating a geological position of the mobile terminal; and
   select one or more mobile terminals each having a moving speed, indicated by the speed data, satisfying the first criterion, and also a geological position, indicated by the position data, satisfying a fourth criterion.

8. The wireless communication system according to claim 7, wherein a mobile terminal having a geological position satisfying the fourth criterion is at least one of (i) a mobile terminal being located at a geological position, indicated by the position data, having a distance from the boundary of the peripheral cell not more than a fourth threshold, and (ii) a mobile terminal being located at a geological position, indicated by the position data, nearer to the boundary of the peripheral cell than mobile terminals that are not selected.

9. A management station that controls a wireless base station having a cell accommodating a plurality of mobile terminals, the management station comprising at least one processor configured to:
   obtain, for each of the plurality of mobile terminals, speed data indicating a moving speed of the mobile terminal;
   select one or more mobile terminals each having a moving speed, indicated by the speed data, satisfying a first criterion among the plurality of mobile terminals; and
   control to decrease a transmission power of the wireless base station having the cell accommodating the selected mobile terminals or to increase an allowable receiving level of the wireless base station.

10. A method for controlling a wireless base station having a cell accommodating a plurality of mobile terminals, the method comprising:
by the wireless base station,
obtaining, for each of the plurality of mobile terminals, speed data indicating a moving speed of the mobile terminal,
selecting one or more mobile terminals each having a moving speed, indicated by the speed data, satisfying a first criterion among the plurality of mobile terminals, and
controlling to decrease a transmission power of the wireless base station having the cell accommodating the selected mobile terminals or to increase an allowable receiving level of the wireless base station.

11. A wireless communication system comprising:
a first wireless base station having a first cell accommodating a plurality of mobile terminals; and
a management station that controls a second wireless base station having a second cell adjacent to the first cell, wherein
the management station comprises at least one processor configured to
obtain, for each of the plurality of mobile terminals, speed data indicating a moving speed of the mobile terminal,
select one or more mobile terminals each having a moving speed, indicated by the speed data, satisfying a first criterion among the plurality of mobile terminals, and
control to increase a transmission power of the second wireless base station having the second cell adjacent to the first cell accommodating the selected mobile terminals or to decrease an allowable receiving level of the second wireless base station.

12. The wireless communication system according to claim 11, wherein a mobile terminal having a moving speed satisfying the first criterion is at least one of (i) a mobile terminal having a moving speed, indicated by the speed data, being less than a first threshold, and (ii) a mobile terminal having a moving speed, indicated by the speed data, being less than those of mobile terminals that are not selected.

13. The wireless communication system according to claim 11, wherein the at least one processor is further configured to:
obtain, for each of the plurality of mobile terminals, first power data indicating a receiving power of the mobile terminal in the first cell currently being communicating with the mobile terminal; and
select one or more mobile terminals each having a moving speed, indicated by the speed data, satisfying the first criterion, and also a receiving power in the first cell currently being communicating with the mobile terminal, indicated by the first power data, satisfying a second criterion among the plurality of mobile terminals.

14. The wireless communication system according to claim 11, wherein the at least one processor is further configured to:
obtain, for each of the plurality of mobile terminals, position data indicating a geological position of the mobile terminal; and
select one or more mobile terminals each having a moving speed, indicated by the speed data, satisfying the first criterion, and also a geological position, indicated by the position data, satisfying a fourth criterion.

15. A management station that controls a wireless base station having a second cell adjacent to a first cell accommodating a plurality of mobile terminals, the management station comprising at least one processor configured to:
obtain, for each of the plurality of mobile terminals, speed data indicating a moving speed of the mobile terminal;
select one or more mobile terminals each having a moving speed, indicated by the speed data, satisfying a first criterion among the plurality of mobile terminals; and
control to increase a transmission power of the wireless base station having the second cell adjacent to the first cell accommodating the selected mobile terminals or to decrease an allowable receiving level of the wireless base station.

16. A method for controlling a wireless base station having a second cell adjacent to a first cell accommodating a plurality of mobile terminals, the method comprising:
by the wireless base station,
obtaining, for each of the plurality of mobile terminals, speed data indicating a moving speed of the mobile terminal,
selecting one or more mobile terminals each having a moving speed, indicated by the speed data, satisfying a first criterion among the plurality of mobile terminals, and
controlling to increase a transmission power of the wireless base station having the second cell adjacent to the first cell accommodating the selected mobile terminals or to decrease an allowable receiving level of the wireless base station.

* * * * *